(12) United States Patent
Gorkovenko

(10) Patent No.: US 9,149,791 B2
(45) Date of Patent: *Oct. 6, 2015

(54) WATER-SOLUBLE CARBOHYDRATE POLYETHERS

(75) Inventor: Alexander A. Gorkovenko, Mission Viejo, CA (US)

(73) Assignee: TRGel, LLC, Mission Viejo, CA (US)

( * ) Notice: Subject to any disclaimer, the term of this patent is extended or adjusted under 35 U.S.C. 154(b) by 825 days.

This patent is subject to a terminal disclaimer.

(21) Appl. No.: 13/205,247

(22) Filed: Aug. 8, 2011

(65) Prior Publication Data

US 2012/0046435 A1    Feb. 23, 2012

Related U.S. Application Data

(63) Continuation-in-part of application No. 12/049,263, filed on Mar. 14, 2008, now Pat. No. 7,994,092.

(60) Provisional application No. 61/391,681, filed on Oct. 11, 2010.

(51) Int. Cl.
| | | |
|---|---|---|
| B01J 20/285 | (2006.01) | |
| B01J 20/286 | (2006.01) | |
| B01J 20/29 | (2006.01) | |
| B01J 20/32 | (2006.01) | |
| C08B 37/00 | (2006.01) | |

(52) U.S. Cl.
CPC .............. *B01J 20/286* (2013.01); *B01J 20/285* (2013.01); *B01J 20/29* (2013.01); *B01J 20/3272* (2013.01); *C08B 37/006* (2013.01)

(58) Field of Classification Search
USPC .................................. 502/404, 401, 402, 526
See application file for complete search history.

(56) References Cited

U.S. PATENT DOCUMENTS 7,994,092 B2 * 8/2011 Gorkovenko et al. ......... 502/404

* cited by examiner

*Primary Examiner* — Edward Johnson
(74) *Attorney, Agent, or Firm* — Gary L. Loomis; G. L. Loomis & Assoc., Inc.

(57) ABSTRACT

The present invention relates to novel carbohydrate polyether compositions that are soluble in aqueous media and particularly to carbohydrate polyether compositions exhibiting reverse thermogelation properties in aqueous media. Also, since the carbohydrate polyethers of the present invention can be conveniently controlled with respect to functionality, molecular weight, polydispersity index, microstructure and tertiary structure, they can be customized for use in a variety of applications.

20 Claims, 8 Drawing Sheets

Test mixture components: (1) uracil, (2) acetophenone, (3) methyl benzoate, (4) toluene and (5) naphthalene.

Test Mixture Components: (1) dimethylphthalate, (2) benzene, (3) toluene, and (4) naphthalene

WATER-SOLUBLE CARBOHYDRATE POLYETHERS

CROSS-REFERENCE TO RELATED APPLICATION

The present application is a continuation-in-part of co-owned U.S. Ser. No. 12/049,263 filed Mar. 14, 2008 now U.S. Pat. No. 7,994,092, and also claims the benefit of U.S. provisional application No. 61/391,681 filed Oct. 11, 2010, both of which are herein incorporated by reference.

FIELD OF THE INVENTION

The present invention relates to novel carbohydrate polyether compositions and the use of such compositions as components of stationary phases for chromatographic separation processes. More particularly, the invention relates to the use of such compositions as components of chiral stationary phases for the chromatographic separation of enantiomers. The invention further relates to novel water-soluble carbohydrate polyether compositions and particularly to water-soluble carbohydrate polyether compositions exhibiting reverse thermogelation properties.

BACKGROUND

The biological activity of chiral chemical compounds often depends upon their absolute stereochemical configuration, since a living body presents a highly enantioselective environment. Therefore, many racemic compounds show significant enantiomeric selectivity in pharmacokinetics and pharmacodynamics. Often a single enantiomer of a racemic mixture has a desired therapeutic effect while the enantiomer of opposite configuration may be ineffective or may even produce undesirable side effects. Awareness of this phenomenon intensified when the teratogenic effects of the drug thalidomide, once used as an anti-nausea medication for pregnant women, emerged in the 1960s. Thalidomide and many other chiral drugs had been sold for years as racemic mixtures. In 1992, the U.S. Food & Drug Administration (FDA) issued a policy on stereoisomeric drugs. Although the FDA allows racemates to be sold, the individual enantiomers must be characterized pharmacologically and toxicologically. It has been estimated that in 2006, 80% of small-molecule drugs approved by FDA were chiral and 75% were single enantiomers and, with increasing evidence of problems related to stereoselectivity in drug action, enantioselective analysis by chromatographic methods has become the focus of intensive research of separation scientists.

High performance liquid chromatography (HPLC) utilizing chiral stationary phases is the most popular method for determining the enantiomeric purity of chemical compounds on analytical columns or for isolating enantiomers on preparative columns. In the chemical and pharmaceutical Industries methods development often includes screening chiral compounds and potential impurities on analytical columns with numerous chiral phases.

Conventionally, chromatographic media utilizing the chirality of natural polysaccharide derivatives are widely known. Most commonly, the polysaccharide derivative is an ester derivative or carbamate derivative of cellulose or amylose. For example, U.S. Pat. No. 4,818,394 to Okamoto et al. discloses and claims various cellulose tribenzoates for the chromatographic resolution of optical isomers and U.S. Pat. No. 5,489,387 to Namikoshi et al. describes a chromatographic separation medium comprising cellulose tris-3-(3-pydridyl)acrylate. U.S. Pat. No. 7,223,334 to Okamoto et al. describes separating agent for enantiomeric isomers using cellulose tris(cyclohexylcarboxylate), cellulose tris(cyclopentylcarboxylate) or cellulose tris(cycloadamantylcarboxylate), while U.S. Pat. No. 7,156,989 to Okamoto et al. describes separating agents for enantiomeric isomers comprising amylose tris 5-indanylcarbamate. Also, U.S. Pat. No. 5,472,599 to Shibata discloses a chromatographic separating agent comprising dextran tribenzoates and U.S. Pat. No. 5,639,824 to Okamoto describes a chromatographic medium consisting of a chemically bonded body comprising a support and a highly substituted oligomeric cyclodextran derivative having a 3,5-dimethylphenylcarbamate constituent.

Although many polysaccharide derivatives have proven useful as chromatographic media, it is well known that such natural polysaccharides show considerable variation with respect to parameters such as molecular weight, proportions of the sugar monomer constituents, degree of branching and particular linkage types. In fact, few natural polysaccharides, if any, are monodisperse. Furthermore, polysaccharides such as cellulose, chitosan, amylose and the like, which are derived from different species or from different sources within a species, show significant variation in structure, chemical properties and molecular weight. Such variability of natural polysaccharides causes problems in the production of consistent chromatographic media and renders the chromatographic methods based on such media less that ideal. Since the synthetic, non-polysaccharide, carbohydrate polyethers of the present invention are essentially monodisperse and uniform in structure, the chromatographic media produced there from are consistent with potentially little or no batch-to-batch variability.

Many stationary phases for HPLC columns utilize polysaccharide derivatives supported on carriers such as alumina, zirconia or silica gel for the purposes of increasing the packing ratio of the separating agent into a column, facilitating handling, enhancing mechanical strength, and the like. The synthetic non-polysaccharide carbohydrate polymers of the present invention are amenable to the known techniques and methods employed to support the chiral selector on such carriers.

The derivatives of natural polysaccharides presently used as chromatographic stationary phases are most commonly coated onto carriers in thick layers, which results in processes wherein transport is slow and peaks are substantially broad. Furthermore, the use of natural high polymers or their derivatives as stationary phases requires the use of carrier particles of large pore-size and since such particles are fragile the operating pressure a high-pressure liquid chromatography (HPLC) system is limited. Therefore, there exists a need for improved non-polysaccharide polymeric materials for use in stationary phases effective for chromatographic separations via a variety of techniques, wherein such stationary phases have controllable and reproducible manufacturability.

There exists a need for chromatographic media that may prepared by methods that allow for a high degree of control of all molecular, chemical and physical properties of the stationary phase.

There exists a need for method for reproducibly providing non-polysaccharide based materials with control of relative hydrophilicity/hydrophobicity.

There exists a need for stationary phases effective for chromatographic separation that may be conveniently modified or custom synthesized to accommodate specific separation requirements.

There exists a need for low molecular weight non-polysaccharide based materials for use as stationary phases of chromatographic media that allow rapid mass transport and high capacity.

There also exists a need for new non-polysaccharide stationary phases effective in chromatographic separation of enantiomers to address increasing demand in the chemical and pharmaceutical industries.

The present invention addresses these and other needs.

Many drugs and other pharmaceutical and bioactive materials exhibit only limited solubility and/or stability in conventional liquid carriers and are therefore often difficult to formulate and administer. In many cases, multiple administrations are required to achieve a desired therapeutic effect for an extended period of time. Various dosage forms and polymeric drug delivery devices and have been investigated for long term, therapeutic treatment of various diseases.

Some polymers exhibit abrupt changes in aqueous solubility as a function of temperature. Certain of such polymers exhibit a lower critical solution temperature (LCST), wherein the interactive forces (e.g. hydrogen bonding) between water molecules and polymer molecules become unfavorable and phase separation occurs. Consequently, aqueous solutions of such polymers often display relatively low viscosity at ambient temperature and exhibit a sharp increase in viscosity following a small temperature increase, resulting in formation of a semi-solid gel. In certain polymers such a transition from a relatively low viscosity solution to a semi solid hydrogel occurs within in the range of mammalian body temperatures and therefore biodegradable embodiments of thermogelling (RTG) polymers have been investigated for use in a variety of biomedical applications such as drug delivery, tissue engineering, and wound healing. In such systems pharmaceutical agents are combined with an aqueous polymer solution at low temperature and, upon injection into a mammalian body, a hydrogel is formed such that the pharmaceutical agent can be released in a controlled manner. However, many of the RTG's examined to date have serious drawbacks for biomedical applications.

Cha et al. in U.S. Pat. No. 5,702,717 describe RTG systems wherein the polymers are block copolymers with a hydrophobic block comprising a poly($\alpha$-hydroxy acid) and poly(ethylene carbonate); and a hydrophilic block comprising poly (ethylene glycol). However, it appears that several of the disclosed hydrogels may not useful for biomedical applications since the lower critical solution temperature (LCST) for many of these gels is greater than 37° C.

Martini et al., J. Chem. Soc., 90(13): 1961-1966 (1994) describe low molecular weight ABA type triblock copolymers which utilize hydrophobic poly($\epsilon$-caprolactone) and poly(ethylene glycol). However, in vitro degradation rates for such copolymers are too slow for use in sustained-release systems.

Stratton et al., in WO 98/02142 describe compositions comprising polyoxyethylene-polyoxypropylene block copolymers having RTG properties for the delivery of proteins. However, such materials have limited in biomedical applications since they are toxic to body organs and are non-biodegradable. Moreover, only high molecular weight polyoxyethylene-polyoxypropylene block copolymers at higher concentrations (15-25 wt. %) exhibit RTG properties.

Other known thermosensitive polymers include poly(ethylene oxide)/polypeptide conjugates and pH-sensitive chitosan/glycerol phosphate compositions. While the degradation products of polypeptides are neutral amino acids and there is no significant pH drop during polymer degradation, such polymers are usually difficult to reproducibly synthesize; and chitosan/glycerol phosphate compositions are known to have low MW components, which may diffuse from the gel causing phase separation of pH sensitive chitosan molecules. In general, natural polymers are much less desirable than synthetic polymers because of batch-to-batch properties variation.

Still other known thermosensitive polymers include water-soluble polyphosphazenes. However, such polyphosphazenes have limited utility since they are not are not readily biodegradable. While such water-soluble poly(phosphazenes) have been studied for drug delivery applications, storage time in aqueous solutions is limited by slow hydrolysis.

Thermosensitive water-soluble biodegradable polymers comprising polylactic acid (PLA) or polylactic acid/polyglycolic acid (PLA/PGA) blocks have been widely investigated for use in biomedical applications. However such compositions are known to generate lactic acid and glycolic acid upon biodegradation, wherein such acids may have adverse effects on acid sensitive drugs. Also, such biodegradable polymers have limited storage stability in aqueous solution.

Therefore, a need exists for thermosensitive biodegradable hydrogel-forming materials prepared by methods that allow for a high degree of control of all molecular, chemical and physical properties.

There exists a need for water-soluble biodegradable polymers for use in various biomedical applications such as delivery of drugs and other pharmaceutical and bioactive materials as well as for use in various food and beverage industries and the like.

Also, there exists a need for methods and processes for reproducibly production of non-polysaccharide based carbohydrate materials with control of relative hydrophilicity/hydrophobicity.

Furthermore, there exists a need for reverse thermogelling (RTG) materials that may be conveniently modified or custom synthesized to provide the degradation rates, sol-gel transition temperatures, critical gelation concentrations and permeability requirements for specific applications.

The present invention addresses these and other needs.

SUMMARY OF THE INVENTION

The present invention relates generally to synthetic carbohydrate polyethers useful as separation agents in chromatographic processes and having controlled architectures and properties as well as to controlled anionic ring-opening living polymerization methods for preparing such carbohydrate polyethers. The present invention further relates to chromatography stationary phases prepared from such carbohydrate polyethers and to separation applications for such chromatography stationary phases. The invention relates, more specifically, to non-polysaccharide poly(2-3)-1,6-anhydroglucopyranoses and derivatives thereof having controlled weight-average molecular weights, narrow polydispersity indices, controlled microstructure, controlled tertiary structure, controlled glass transition temperature, and controlled hydrophilicity or hydrophobicity and that find utility as components of chromatography stationary phases for use in separation systems and especially for chiral chromatographic separation systems such high-performance liquid chromatography (HPLC).

Suitable poly(2-3)-1,6-anhydroglucopyranoses are prepared by an anionic ring-opening living polymerization of 1,6:2,3-dianhydrohexopyranoses (Cerny epoxides) by known methods. Since the resulting 2-3 linked carbohydrate polyethers do not have glycosidic bonding between monomer units, such carbohydrate polyethers are not polysaccharides. Such synthetic polyether carbohydrates can exhibit a polydispersity index (PDI) considerably less than 2.0, which is considerably lower than the PDI for nearly all carbohydrate polymers found in nature as well as most man-made polymers. Furthermore, the chain length of such polymers is readily controlled and may be manipulated to serve the needs of specific applications. Additionally, the synthetic carbohydrate polyethers of the present invention produced via anionic living polymerization techniques are useful in the production of a variety of derivatives with carefully controlled molecular structures.

The present invention also provides synthetic carbohydrate polyethers with large degree of structural variation achieved by choice of substituents in the 1,6:2,3-dianhydrohexopyranoses monomers as well as by post-polymerization functionalization.

Suitable support materials for embodiments of the chromatographic stationary phases of present invention includes porous inorganic carriers such as silica, alumina, magnesia, titanium dioxide, zirconia, glass, silicates, kaolin, metals and the like as well as porous organic carriers such as polyolefins, polystyrene, polyacrylamides, polyacrylates and the like. The carbohydrate polyether compositions of the present inventions can be affixed to the carrier by either chemical bonding or a physical association. For use in certain chromatography applications the C2-C3 linked carbohydrate polyethers compositions of the present invention may be coated onto the interior surface of a suitable capillary column.

Although other polymers may be included in the stationary phases of the present invention, in preferred embodiments one or more C2-C3 linked polyethers of a 1,6:2,3-dianhydrohexopyranose derivatives is 10% to 100% by weight of the non-carrier content of the stationary phase. In preferred embodiments the C2-C3 linked polyether of a 1,6:2,3-dianhydrohexopyranose derivative is 90 to 100% by weight of the total polymer content, i.e. 90 to 100% by weight of the non-carrier content, of the stationary phase.

In certain preferred embodiments, C2-C3 linked carbohydrate polyethers compositions and derivatives thereof the present invention are covalently coupled or crosslinked to from a self-supporting macroreticular network, which can function directly as chromatography stationary phases without the need for a carrier material. The required covalent coupling or crosslinking can be effected by any known method such as free-radical crosslinking, which can be effected by chemical processes, irradiation processes or combinations thereof. Additionally, crosslinking promoters such as bifunctional, trifunctional or tetrafunctional acrylates or methacrylate monomers and oligomers may be added to increase crosslinking efficiency and crosslink density.

In other embodiments self-supporting macroreticular networks can be produced by the covalent coupling of the carbohydrate polyethers of the present invention. For example, initiation of the living polymerization with trifunctional alkoxide initiators produces star polymers, which after termination with amino groups and subsequent crosslinking with trifunctional isocyanates produce such three-dimensional networks.

Additionally, the invention presents biodegradable water-soluble non-polysaccharide poly(2-3)-1,6-anhydroglucopyranose compositions and derivatives thereof, which find utility in biocompatible thermosensitive aqueous solutions, wherein certain of such solutions are injectable. The invention further presents novel water-soluble carbohydrate polyether compositions exhibiting reverse thermogelation properties and to uses as well as processes and methods for producing such compositions.

Certain embodiments of the present invention relate to water-soluble carbohydrate polyethers that are useful in a variety of industries including, but not limited to, pharmaceutical industries, biomedical industries and food industries where the polymers are useful as viscosity modifiers, coagulants, flocculants, conjugates for bioactive molecules including drugs and the like.

Particularly useful synthetic carbohydrate polymers of the present invention are thermosensitive, water-soluble, biocompatible polymers that gel or precipitate in response to an increase in temperature, which is a property known as reverse thermogelation (RTG). Such materials are useful as components in a variety of biomedical applications, while other applications may include use as food additives and other such applications.

Since the synthetic, non-polysaccharide, carbohydrate polyethers of the present invention are essentially monodisperse and uniform in structure, the thermogelling formulations produced therefrom are reproducibly consistent and exhibit little or no batch-to-batch variability.

DETAILED DESCRIPTION OF THE INVENTION

Figure 1:
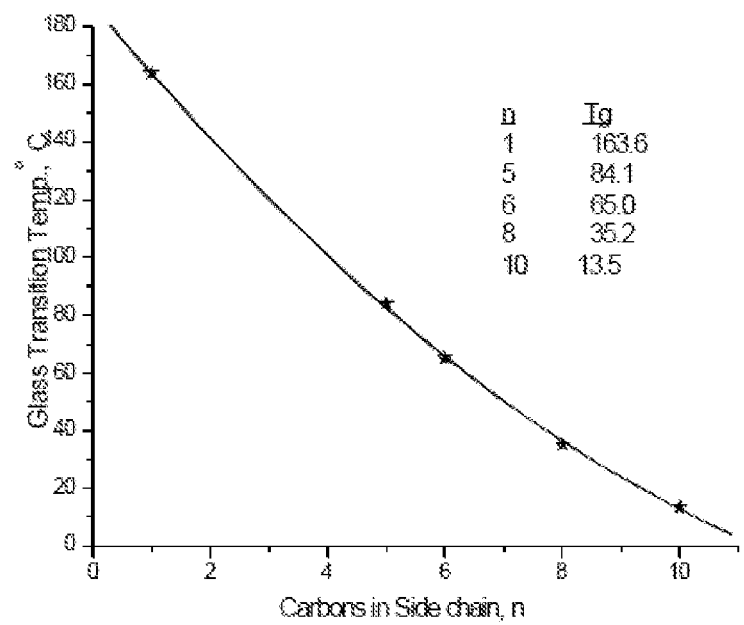
FIG. 1 presents a graph showing relationship between of $T_g$ and number of carbon atoms in an alkyl side-chain of poly(2-3)-1,6-anhydro-4-O-alkyl-β-D-glucopyranose.

As used herein, the following terms shall have the following meaning.

"reverse thermal gelation (RTG)" is defined as meaning the temperature below which a polymer is soluble in water and above which the polymer forms a semi-solid, i.e. gels, emulsions, dispersions and suspensions.

"reverse thermogelling polymers" or "RTG polymers" is defined as meaning that the polymer is soluble in water and is capable of reverse thermal gelation.

"lower critical solution temperature (LCST)" is the temperature at which a soluble polymer undergoes reverse thermal gelation. For purposes of the present invention, the term "lower critical solution temperature (LCST)" is used interchangeably with "reverse thermal gelation (RTG) temperature".

"biodegradable" refers to a material that erodes or degrades in vivo to produce smaller non-toxic components.

"swellable polymer" refers to a polymer which can absorb at least 1-3% w/w of water without dissolution in an aqueous solution.

"TRGel polymers" refers to poly(2-3)-1,6-anhydro-β-D-glucopyranoses which are soluble in or swell in aqueous media.

The polymers useful in embodiments of the present invention are carbohydrate polyethers, which can be linear or non-linear and can be homopolymers, copolymers or combinations thereof. The non-linear polymers of the invention can have a variety of architectures, including for example star-polymers, branched polymers, graft polymers, cross-linked polymers, semi-cross-linked polymers and the like or combinations thereof. These various polymer architectures are achieved with a high degree of control by the polymer preparation methods of the invention.

The chromatographic media of the present invention comprise derivatives of C2→C3 linked carbohydrate polyethers produced from monomeric 1,6:2,3-dianhydrohexopyranoses of formula (I). Such 1,6:2,3-dianhydrohexopyranoses of formula (I), which are also known variously as 1,6:2,3-dianhydro-4-O—R-β-D-mannopyranoses; 1,6:2,3-dianhydro-β-D-glucopyranoses and Cerny epoxides, have been utilized as intermediates in organic synthesis since the 1970s. The anionic ring-opening polymerization, under conditions for living polymerization, of 1,6:2,3-dianhydrohexopyranose of formula (I) where R=benzyl, methyl, allyl or hexadecyl has been reported by Berman et al., Polymer Science USSR 30: 481-487 (1988); Berman et al., Polymer Science U.S.S.R., vol. 30, no. 2, pp. 394-400 (1988) and Berman et al., Bioorganischeskaya Khimiya, vol. 11, no. 8, pp. 1125-1129, 1985.

A method for bonding the polysaccharide levoglucosan to the surface of an epoxysilane modified macroporous glass utilizing a low concentration of poly(2-3)-1,6-anhydro-4-O-methyl-β-D-glucopyranose as a polyfunctional crosslinking agent under cationic conditions has been reported by Gorkovenko et al., Izvestia Academii Nauk USSR, Ser. Khim. No. 9, pp. 2091-2094, 1987.

Additionally, Japanese Patent No. 10259186 to Takeshi discloses polymers of unspecified structure derived from fluorosilicone-modified derivatives of 1,6:2,3-dianhydrohexopyranoses which are useful as materials for the production of contact lenses.

For the purposes of the present invention a living polymerization is, as defined in the IUPAC Compendium of Chemical Terminology, 2nd Edition, 1997, a chain polymerization from which chain transfer and chain termination steps are absent. In many cases, the rate of chain initiation is fast compared with the rate of chain propagation, so that the number of kinetic-chain carriers is essentially constant throughout the polymerization. In effect, a living polymerization continues until the monomer supply has been exhausted and if additional monomer is added to the reaction mixture the polymerization will resume. Therefore, by variation the monomer feed, block copolymers with well-defined block lengths may be conveniently produced. Polymers of uniform molecular weight, i.e. low polydispersity, are characteristic of polymers produced by living polymerization techniques. Also, since the monomer supply is controllable, the chain length may be manipulated to serve the needs of a specific application. Additionally, anionic living polymerization techniques are useful in the production of a variety of polymers with carefully controlled structures including branched polymers, ladder polymers, framework polymers, star polymers, AB type diblock copolymers and ABA type triblock polymers as well as variations and combinations thereof. The carbohydrate polymer structures made according to anionic living polymerization techniques herein described can be produced with a high degree of regiospecificity, stereospecificity and precisely controlled molecular weight, rendering such polymers ideal for use in chromatographic media.

A particularly desired feature of embodiments of the carbohydrate polyethers of the present invention is that they have a narrow polydispersity index (PDI), which is a measure of the distribution of molecular mass in a given polymer sample. The PDI is calculated as the weight average molecular weight (Mw) divided by the number average molecular weight (Mn). Therefore PDI=Mw/Mn and indicates the distribution of individual molecular masses in a given polymer preparation. The PDI always has a value of 1.0 or greater and in a given polymer as the chains approach uniform length the PDI approaches unity. Most polysaccharides and carbohydrate polymers found in nature as well as most man-made polymers have a PDI greater than 2.0 with many having a PDI greater than 5.0. By contrast the polydispersity index (PDI) of the polymers useful in embodiments of the present invention is less than 2.0. The preferred PDI for all polymers useful in embodiments of the present invention is in the range of about 1.05 to 2.0 with a range of about 1.05 to 1.5 being most preferred.

A 1,6:2,3-dianhydrohexopyranose monomer useful for the synthesis of polymers of the present invention is shown in general structural formula (I) wherein R represents any moiety that does not interfere with anionic living polymerization, i.e., R should be a moiety that is weakly reactive or unreactive toward anions and other strong nucleophiles. In general, R is chosen to be a moiety that is neither nucleophilic nor electrophilic. In certain embodiments of the present invention R=straight-chain or branched alkyl, straight-chain or branched alkenyl, aryl, alkyl substituted aryl, aryl substituted alkyl, oxyalkyl, oxyethyl, poly(oxyalkylene), and poly(oxyethyene). In certain preferred embodiments R=straight-chain or branched alkyl with chain lengths from 1 to 18 carbon atoms and straight-chain or branched alkenyl with chain lengths from 1 to 18 carbon atoms. In certain other preferred embodiments R=straight-chain or branched alkyl with chain lengths from 1 to 12 carbon atoms and straight-chain or branched alkenyl with chain lengths from 1 to 12 carbon atoms. Particularly useful monomers for the synthesis of polymers of the present invention are 1,6:2,3-dianhydrohexopyranose monomers of structural formula (I) wherein R=allyl or benzyl.

(I)

(II)

Monomer units of the C2-C3 linked carbohydrate polyethers produced directly by the anionic, ring-opening, living polymerization of a monomer of formula (I) are represented by the general structural formula (II), wherein n=the average number of monomer units in a polymer chain.

The overall synthesis of a poly(2-3)-1,6-anhydro-4-O-β-D-glucopyranose of formula (II) by the anionic, ring-opening polymerization of a 1,6:2,3-dianhydrohexopyranose of formula (I) is illustrated in Reaction Scheme A. In this reaction sequence, the anionic initiator A⁻ attacks the 1,6:2,3-dianhydrohexopyranose (I) at C-2 opening the 2-3 epoxy ring to afford the alkoxyl anion of formula (III) which subsequently the attacks a second molecule of (I) in a like manner to open the 2-3 epoxy ring forming an ether linkage and a new alkoxyl anion of formula (IV) to begin the living polymerizing chain. This sequence of steps continues until all monomer is consumed and a high polymer is produced. It is important to note that such a living polymerization can be stopped at anytime by starving the reaction mixture of monomer at which time the growing polymer chain has a 'living end' and that the polymerization resumes when new monomer is introduced. The new monomer may be the same as the initial monomer or may be any other suitable monomer. Furthermore, two or more suitable monomers may be present in the initial reaction mixture, wherein the structure of the resulting copolymer is controlled by the concentrations and relative reactivity of the monomers. Since such a living polymerization adds monomers to a growing chain in serial fashion, molecular weight and copolymer composition are precisely controlled. Also, initiation of such living polymerizations can occur heterogeneously, i.e. from suitably reactive surfaces or in networks with suitable reactive sites such as anions.

Reaction Scheme A

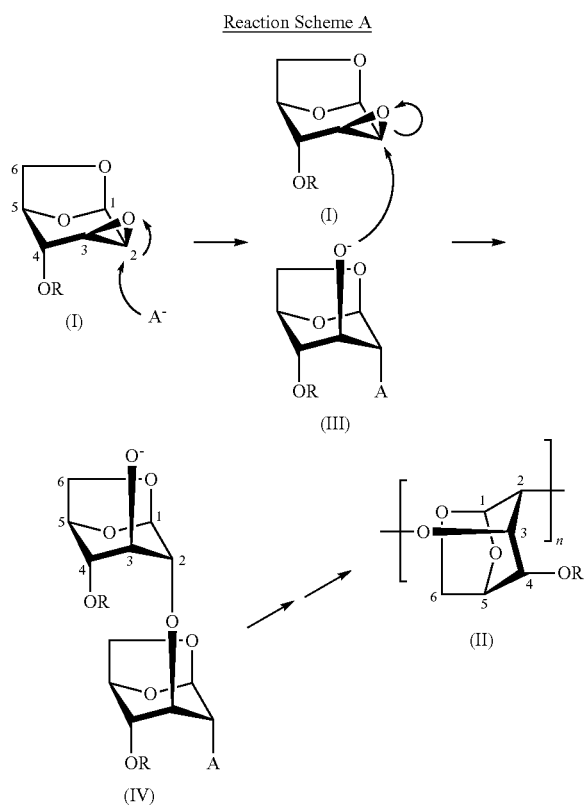

In certain embodiments, after polymerization any or all of the —OR functionalities attached to C-4 of the carbohydrate polyethers of general formula (II) are de-protected and/or derivatized to introduce a wide variety of functionality, thus offering a degree of flexibility of structural variation that is not possible with polysaccharides known in the art for use in chiral chromatography media. In such a post-polymerization functionalized carbohydrate polyether units of general formula (II) the moiety —OR at the C-4 ring position are chosen from or are converted to a variety of reactive functional moieties such as amines, amides, carboxylic acids, esters, aldehydes, ketones, alkylthiols, arylthiols, carbamates, arylates, cyanates, ioscyanates, haloalkanes, haloformates, N-hydroxysuccinimides, maleimides, phosphates, phosphorodithioates, phosphites, phosphonates, phosphorothioates, pyridyldisulphides, sulphamates thiophosphates. silanes, siloxanes, thioethers, nitrates, nitriles, nitrosooxy, thiols, sulfides, disulfides and the like. The functional moieties are chosen to render the stationary phase prepared with the carbohydrate polyether of general formula (II) effective for chromatographic separations. In certain preferred embodiments of carbohydrate polyethers represented by the general formula (II) R is chosen from the group consisting of H, straight-chain alkyl, branched alkyl, straight-chain alkenyl, branched alkenyl, allyl, aryl, benzyl, carbamyl, N-substituted carbamyl, alkanoyl and aroyl. Particularly useful substituted carbamate moieties include 3,5-dimethylphenylcarbamate, dichlorophenylcarbamates, phenylcarbamates, and tolylcarbamates as well as mixtures thereof.

For purposes of the present invention, "water-soluble" is intended to mean that the polymer compositions are substantially soluble in water or other aqueous environments. Thus, although certain regions or segments of a copolymer may be hydrophobic or even water-insoluble, the copolymer molecule, as a whole, dissolves in water or water-containing environments in substantial measure. In general, embodiments of the water-soluble carbohydrate polyethers of the present invention having molecular weight greater than 2,000 Daltons exhibit a water solubility of at least 0.1 g/100 mL, while other embodiments may exhibit water solubility greater than 5.0 g/100 mL. In certain preferred embodiments the water-soluble carbohydrate polyethers of the present invention exhibit water solubility greater than 0.5 g/100 mL. In yet other embodiments, water-soluble carbohydrate polyethers of the present invention at all molecular weights are completely soluble in or miscible with water as well as other aqueous compositions including water/organic solvent mixtures utilizing water-miscible organic solvents including, but not limited to, alcohols such as methanol, ethanol, propanol, isopropanol, butanol and the like, ethyl lactate, dimethyl sulfoxide, polyethylene glycol 200, acetone, tetrahydrofurfuryl alcohol, N-methyl-2-pyrrolidone, glycerol formal, Solketal, glycofurol, propylene glycol, dimethyl isosorbide and diglyme.

Also, certain water-soluble glucopyranose polyethers of the present invention are particularly useful in biological applications such as surface protection from non-specific adsorption.

In certain embodiments, the water-soluble glucopyranose polyethers of the present invention exhibit lower critical solution temperature (LCST) behavior, which means that the polymers are more soluble when the temperature of the solvent is lowered. Other water-soluble polymers such as polyethylene oxide (PEO) also display LCST behavior, but the transition temperature of PEO is about 100° C., while certain embodiments of the water-soluble carbohydrate polyethers of the present invention a transition temperature as low as 17° C. Furthermore, the transition temperature of embodiments of the water-soluble carbohydrate polyethers of the present invention can be modified and controlled via copolymerization and selective functionalization.

In certain embodiments of polymer compositions comprising monomer units of general structural formula (II), R is a moiety chosen to render the polymer composition water-soluble. In certain such embodiments, wherein R is a moiety chosen to render the polymer composition water-soluble, R has the structure:

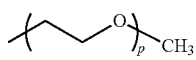

where p is an integer from 1 to 10.
While in certain other embodiments p is an integer from 1 to 4, and in yet other embodiments p is an integer from 1 to 2.

In certain other embodiments of polymer compositions comprising units of general structural formula (II), wherein R is a moiety chosen to render the polymer composition water-soluble, R is a moiety also chosen to afford a polymer composition that exhibits reverse thermal gelation. In certain such embodiments such polymers exhibiting reverse thermal gelation have a critical solution temperature in the range of 17° to 74° C.

In certain embodiments the water-soluble polymer compositions comprising units of general structural formula (II) have a molecule weight from 2 kDa to 350 kDa, while in certain preferred embodiments the polymer compositions have a molecule weight from 5 kDa to 150 kDa.

Certain embodiments utilize copolymers of the general formula (V), wherein n and m represent the number of monomer units per chain. Such copolymers may be random copolymers, block copolymers or combinations of random copolymers and block copolymers.

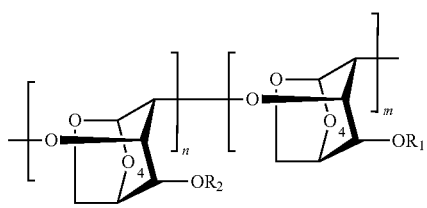

(V)

In such copolymers the moieties —OR$_1$ and —OR$_2$ at the C-4 ring positions are chosen from or are converted to variety of reactive functional moieties such as amines, amides, carboxylic acids, esters, aldehydes, ketones, alkylthiols, arylthiols, carbamates, arylates, cyanates, ioscyanates, haloalkanes, haloformates, N-hydroxysuccinimides, maleimides, phosphates, phosphorodithioates, phosphites, phosphonates, phosphorothioates, pyridyldisulphides, sulphamates thiophosphates. silanes, siloxanes, thioethers, nitrates, nitriles, nitrosooxy, thiols, sulfides, disulfides and the like. The functional moieties are chosen to render the stationary phase prepared with the carbohydrate polyether of general formula (V) effective for chromatographic separations. In certain preferred embodiments of carbohydrate polyethers represented by the general formula (V) R$_1$ and R$_2$ are chosen from the group consisting of H, straight-chain alkyl, branched alkyl, straight-chain alkenyl, branched alkenyl, allyl, aryl, benzyl, carbamyl, N-substituted carbamyl, alkanoyl and aroyl. Particularly useful substituted carbamate moieties including 3,5-dimethylphenylcarbamate, dichlorophenylcarbamates, phenylcarbamates, and tolylcarbamates as well as mixtures thereof.

Certain preferred embodiments of copolymers of formula (V) comprise 1-5% monomer units wherein R$_1$ or R$_2$=allyl. Such allyl functionalization is particularly useful in providing the polymers with carbon-carbon double bonds as sites for cross-linking.

In certain embodiments, after polymerization any or all of the protected latent hydroxyl functionalities in the C-1, C-4 and C-6 positions of polymers units of the general formula (II) are de-protected and/or derivatized to introduce a wide variety of functionality thus offering a degree of flexibility of structural variation that is not possible with polysaccharides known in the art as chiral chromatography media. Such a functionalized carbohydrate polyether unit is represented by the general formula (VI).

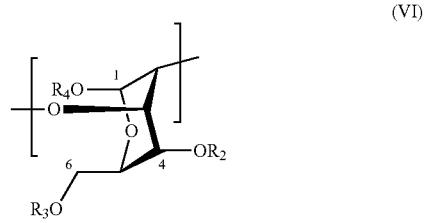

(VI)

In such a functionalized carbohydrate polyether unit represented by the general formula (VI) the moieties —OR$_2$, —OR$_3$ and —OR$_4$ at the C-4, C-6 and C-1 ring positions respectively are chosen from or are converted to variety of reactive functional moieties such as amines, amides, carboxylic acids, esters, aldehydes, ketones, alkylthiols, arylthiols, carbamates, arylates, cyanates, ioscyanates, haloalkanes, haloformates, N-hydroxysuccinimides, maleimides, phosphates, phosphorodithioates, phosphites, phosphonates, phosphorothioates, pyridyldisulphides, sulphamates thiophosphates. silanes, siloxanes, thioethers, nitrates, nitriles, nitrosooxy, thiols, sulfides, disulfides and the like. The functional moieties are chosen to render the stationary phase prepared with the carbohydrate polyether of general formula (VI) effective for chromatographic separations. In certain preferred embodiments of carbohydrate polyethers represented by the general formula (VI) R$_2$, R$_3$ and R$_4$ are chosen from the group consisting of H, straight-chain alkyl, branched alkyl, straight-chain alkenyl, branched alkenyl, allyl, aryl, benzyl, carbamyl, N-substituted carbamyl, alkanoyl and aroyl. Particularly useful substituted carbamate moieties including 3,5-dimethylphenylcarbamate, dichlorophenylcarbamates, phenylcarbamates, and tolylcarbamates as well as mixtures thereof. Additionally in certain other preferred embodiments of carbohydrate polyethers represented by the general formula (VI) the oxygen atoms at C-1, C-4 and C-6 are derivatized by reaction with a polyalkylene ether diol including, but not limited to, polyethylene glycol, polypropylene glycol and poly(tetramethylene ether) glycol. A non-limiting example of a such post polymerization funcionalization is the benzolysis of a monomer unit of a typical carbohydrate polyether of structural formula (II), which leads to a symmetric addition of benzoyl groups to the ring resulting in a polymer in which some or all monomer units have structural formula (VI), where R$_3$=R$_4$=benzoyl. Such a transformation is conveniently effected by stirring polymer with benzoic anhydride in the presence of anhydrous sulfuric acid for a few hours at room temperature.

In certain embodiments of polymer compositions comprising units of general structural formula (VI), R$_2$, R$_3$, and R$_4$ are moieties chosen to render the polymer composition water-soluble. In certain other such embodiments, wherein $R_2$, $R_3$, and $R_4$ are moieties chosen to render the polymer composition water-soluble, at least one of the moieties $R_2$, $R_3$ and $R_4$ has the structure:

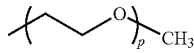

where p is an integer from 1 to 10.

While in certain other embodiments p is an integer from 1 to 4, and in yet other embodiments p is an integer from 1 to 2.

In certain other embodiments of polymer compositions comprising units of general structural formula (VI), wherein $R_2$, $R_3$, and $R_4$ are moieties chosen to render the polymer composition water-soluble, $R_2$, $R_3$, and $R_4$ are moieties chosen to afford a polymer composition that exhibits reverse thermal gelation. In certain such embodiments the polymers exhibiting reverse thermal gelation have a critical solution temperature from 17 to 74° C.

In certain embodiments the water-soluble polymer compositions comprising units of general structural formula (VI) have a molecule weight from 2 kDa to 350 kDa, while in certain preferred embodiments the polymer compositions have a molecule weight from 5 kDa to 150 kDa.

Another non-limiting example of the post polymerization funcionalization of polymers of the present invention is the acetylation of the oxygen atoms at ring positions C-1 and C-6 of a carbohydrate polyether of structural formula (II), wherein treatment with hydrofluoric acid and acetic anhydride effects a ring opening resulting in introduction of acetyl functionalities, which may further reacted or substituted. Such sequence is illustrated in Reaction Scheme B.

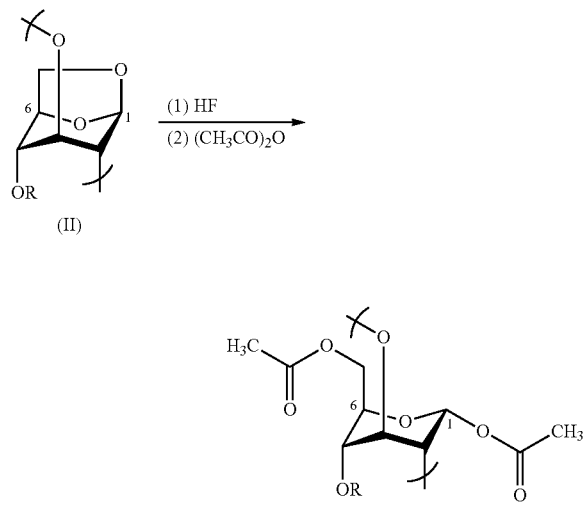

Certain other embodiments of the invention utilize copolymer units of the general formula (VII), wherein n and m represent the number of monomer units per chain. Such copolymers may be random copolymers, block copolymers or combinations of random and block copolymers.

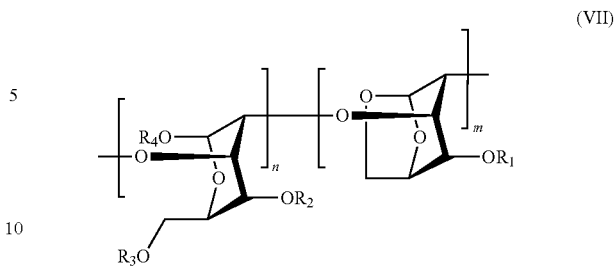

In such a functionalized carbohydrate polyether units represented by the general structural formula (VII) the moieties —$OR_1$, —$OR_2$, —$OR_3$ and —$OR_4$ are chosen from or are converted to variety of reactive functional moieties such as amines, amides, carboxylic acids, esters, aldehydes, ketones, alkylthiols, arylthiols, carbamates, arylates, cyanates, ioscyanates, haloalkanes, haloformates, N-hydroxysuccinimides, maleimides, phosphates, phosphorodithioates, phosphites, phosphonates, phosphorothioates, pyridyldisulphides, sulphamates thiophosphates. silanes, siloxanes, thioethers, nitrates, nitriles, nitrosooxy, thiols, sulfides, disulfides and the like. The functional moieties are chosen to render the stationary phase prepared with the carbohydrate polyether of general formula (VII) effective for chromatographic separations. In certain preferred embodiments of carbohydrate polyethers represented by the general formula (VII) the moieties $R_1$, $R_2$, $R_3$ and $R_4$ are chosen from the group consisting of H, straight-chain alkyl, branched alkyl, straight-chain alkenyl, branched alkenyl, allyl, aryl, benzyl, carbamyl, N-substituted carbamyl, alkanoyl and aroyl. Particularly useful substituted carbamate moieties including 3,5-dimethylphenylcarbamate, dichlorophenylcarbamates, phenylcarbamates, and tolylcarbamates as well as mixtures thereof. Additionally in certain other preferred embodiments of carbohydrate polyethers represented by the general formula (VII) the oxygen atoms at C-1, C-4 and C-6 ring positions are derivatized by reaction with a polyalkylene ether diol including, but not limited to, polyethylene glycol, polypropylene glycol and poly(tetramethylene ether) glycol.

In certain embodiments the carbohydrate polyethers of the present invention are designed to be water-soluble, while in certain other embodiments the polymers are designed to be water-insoluble, but swellable in water. Additionally, in certain other embodiments the carbohydrate polyethers of the present invention are designed to produce aqueous emulsions, dispersions or suspensions. In essence the relative hydrophilicity/hydrophobicity of the carbohydrate polyethers of the present invention is controlled via selection of the functionality at one or more of the C-1, C-4 and C-6 positions on the glucopyranose rings and the number of rings so functionalized, i.e. the concentration of the functionality. By such selection techniques compositions can be prepared to provide aqueous solutions, aqueous emulsions or aqueous suspensions.

In certain other embodiments 3,5-dimethylphenylcarbamate functionalized polymers are synthesized by treating a polymer of formula II with acetic anhydride and sodium methoxide followed by treatment with an isocyanate as shown in Reaction Scheme C.

Reaction Scheme C

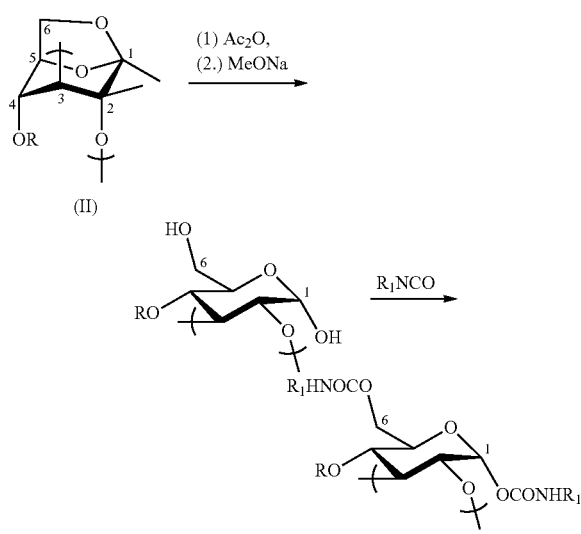

In certain other embodiments some or all of pyranose ether linkages of 1,6:2,3-dianhydrohexopyranoses of the general structural formula (II) are reductively cleaved to afford non-cyclic polyol units within the polymer chains. Chemical reduction at C-1 of ring-opened derivatives of poly(2-3)-D-glucopyranoses can be achieved by with use of known reducing agents including, but not limited to, sodium borohydride and sodium cyanoborohydride. Particularly useful are the poly(2-3)-sorbitols of structural formula (VIII), which are conveniently prepared from the poly(2-3)-1,6-anhydro-4-O-β-D-glucopyranoses (II) as described by Berman et al., Izvestia Academii Nauk USSR, Ser. Khim. No. 3, pp. 705-707, 1988.

Reacrtion Scheme D

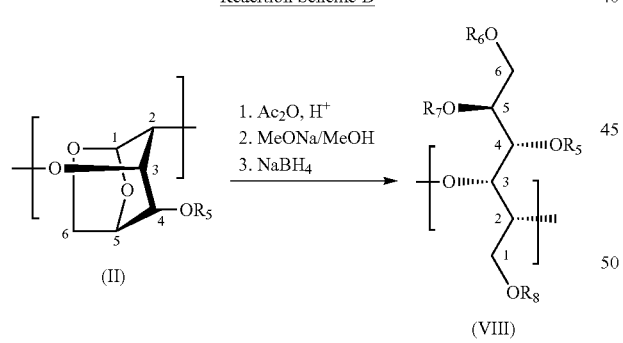

A typical reaction sequence is shown in Reaction Scheme D where in a first step a carbohydrate polyether structural formula (II) is treated with acetic anhydride under conditions of acid catalysis to open the furan ring and introduce acetate moieties at C-1 and C-6. In step 2 the acetate moieties at C-1 and C-6 are saponified with sodium methoxide in methanol to produce C-1 and C-6 hydroxy moieties. Finally, in step 3 reduction of the pyranose ring with sodium borohydride yields the poly(2-3) sorbitols of general structural formula (VIII). These hydroxylated chiral ring-opened derivatives of poly(2-3)-D-glucopyranose may be further derivatized with functionalities known in the art as being suitable for use in chiral chromatography. Particularly useful are poly(2-3) sor- bitols of general structural formula (VIII) wherein $R_5$, $R_6$, $R_7$ and $R_8$ are chosen from the group consisting of H, straight-chain alkyl, branched alkyl, straight-chain alkenyl, branched alkenyl, allyl, aryl, carbamyl, N-substituted carbamyl, alkanoyl and aroyl. Particularly useful substituted carbamate moieties include 3,5-dimethylphenylcarbamate, dichlorophenylcarbamates, phenylcarbamates, and tolylcarbamates as well as mixtures thereof.

In certain embodiments of polymer compositions comprising units of general structural formula (VIII), $R_5$, $R_6$, $R_7$ and $R_8$ are moieties chosen to render the polymer composition water-soluble. In certain other such embodiments, wherein $R_5$, $R_6$, $R_7$ and $R_8$ are moieties chosen to render the polymer composition water-soluble, at least one of the moieties $R_2$, $R_3$ and $R_4$ has the structure:

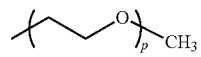

where p is an integer from 1 to 10.

While in certain other embodiments p is an integer from 1 to 4, and in yet other embodiments p is an integer from 1 to 2.

In certain other embodiments of polymer compositions comprising units of general structural formula (VIII), wherein $R_5$, $R_6$, $R_7$ and $R_8$ are moieties chosen to render the polymer composition water-soluble, $R_5$, $R_6$, $R_7$ and $R_8$ are moieties chosen to afford a polymer composition that exhibits reverse thermal gelation. In certain such embodiments the polymers exhibiting reverse thermal gelation have a critical solution temperature from 17° to 74° C.

In certain embodiments the water-soluble polymer compositions comprising units of general structural formula (VIII) have a molecule weight from 2 kDa to 350 kDa, while in certain preferred embodiments the polymer compositions have a molecule weight from 5 kDa to 150 kDa.

Non-limiting examples of embodiments wherein the carbohydrate polyethers of the present invention are water-soluble comprise moieties represented by structural formula (IX), where p is an integer from 1 to 10, preferably from 1 to 4 and most preferably from 1 to 2.

(IX)

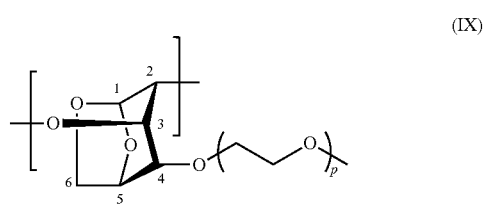

Other non-limiting examples of embodiments wherein the carbohydrate polyethers of the present invention are water-soluble comprise moieties represented by structural formula (VI), wherein at least one of $R_2$, $R_3$ and $R_4$ has the structure:

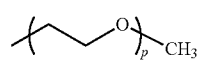

where p is an integer from 1 to 10 and preferably from 1 to 4 and most preferably from 1 to 2.

In certain other embodiments the glass transition temperature ($T_g$) of the carbohydrate polyethers is controlled over a wide range by variation of the nature and concentration of the glucopyranose ring substituents. For example, the relationship between $T_g$ and the number of carbon atoms in the alkyl side chain of poly(2-3)-1,6-anhydro-4-O-alkyl-β-D-glucopyranoses with structure of formula (II) is illustrated graphically in FIG. 1, wherein the $T_g$ is observed to increase as the number of carbon atoms in the alkyl side-chain is decreased.

Control of the chain structure, i.e. linear, branched, star and the like, is achieved via use of a suitable monofunctional or polyfunctional anionic initiators. A non-limiting illustration of the preparation of a suitable monofunctional anionic initiator is presented in Scheme E wherein a solution of 2-butoxyethanol, also commonly known as cellosolve, in tetrahydrofuran (THF) is treated with an excess of potassium metal to afford potassium 2-butoxyethoxide. A non-limiting illustration of the preparation of a suitable trifunctional anionic initiator is presented in Scheme F wherein a solution of 1,3, 5-benzenetrimethanol in THF is treated with an excess of potassium metal to afford potassium 1,3,5-benzenetrimethoxide. In both of these illustrations, the initiator solution thus produced may be stored over potassium metal in a dry box and the initiator concentration in the solution is determined by titration before use.

Reaction Scheme E

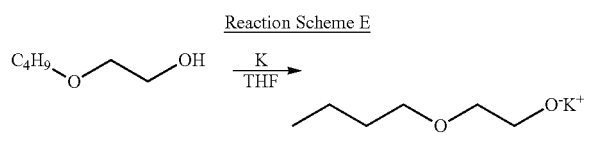

Reaction Scheme F

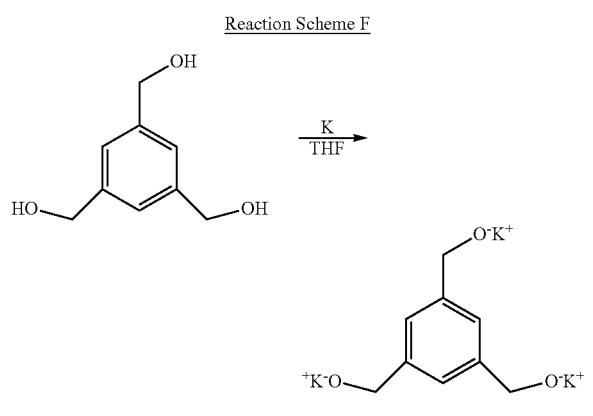

In general, functional groups may be introduced at the chain-ends of the carbohydrate polyethers of the present invention by the use of specific initiation or termination agents, while functionality along the polymer chain may be introduced or modified by post-polymerization reactions. This ability to introduce selective functionality into the polymers allows for the preparation of carbohydrate polyethers useful in the preparation of protein, peptide and drug conjugates. Polymers with non-reactive moieties such as alkyl at one terminus of the polymer chain are particularly useful for the homogeneous preparation of conjugates in the absence of cross-linking reactions. In certain embodiments, polymers of the present invention can be prepared with distinct reactive functional groups at the chain ends, wherein such heterobifunctional polymers are useful for applications such as targeted drug delivery and biosensors.

Examples of functional initiators for the anionic ring-opening polymerizations herein described included, but are not limited to, potassium 3,3-diethoxypropanolate, potassium 2-buthoxy ethanolate, dipotassium 3-thiolate-1-propionate and potassium allyl alkoxide. Allyl alkoxide is a particularly useful initiator since the resulting allyl ether end-group is easily converted a variety of other functionalities.

Examples of functional termination agents for the anionic ring-opening polymerizations herein described include, but are not limited to, alkyl halides, acylhalides, acid anhydrides, aldehydes, ethylene sulfide, ethylene oxide, 1,3-dibromoethane and 3-bromomethylpropyonate.

In other embodiments, chain initiation may be effected with a surface-bound initiator such as an alkali metal thiolate. Such a heterogeneous surface-bound initiator is useful for forming densely packed, brush type polymers, covalently bound to a surface such as silica. Surface initiation has the further advantage of low steric hindrance to attachment, since only a single monomer unit is attached at a time.

The 1,6:2,3-dianhydrohexopyranoses (Cerny epoxides) suitable as monomers for production of polymers of the present invention were prepared according to known methods starting from 1,6-anhydro-β-D-glucopyranose of general formula (X) also commonly known as levoglucosan. In a typical procedure, the levoglucosan hydroxyl moieties at C-2 and C-4 were converted to p-toluenesulfonate esters by treatment with p-toluenesulfonyl chloride in pyridine TsCl/Py). Subsequent treatment of the reaction mixture with a strong base, such as sodium methoxide in methanol (MeONa/MeOH), effected the regioselective formation of the 3,4-epoxide resulting in formation of 1,6:3,4-dianhydro-2-O-p-toluenesulfonyl-β-D-galactopyranose (XII) (also referred to as TDG) without recovery of the di-p-toluenesulfonate intermediate (XI). The TDG thus produced was conveniently purified via conventional crystallization processes. The overall synthetic scheme is illustrated below in Reaction Scheme G.

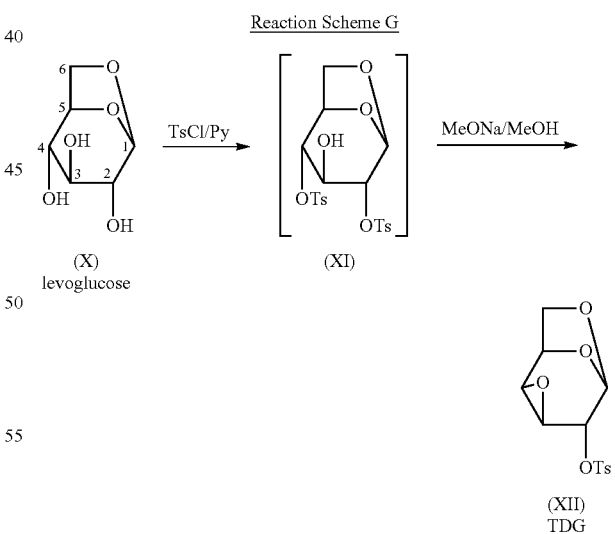

In a subsequent reaction a dianhydromannopyranose (XIV), also referred to herein as a DM monomer, was produced via the acid-catalyzed alcoholysis of 1,6:3,4-dianhydro-2-O-p-toluenesulfonyl-β-D-galactopyranose (XII) via treatment with an alcohol (ROH) in the presence of a suitable acid catalyst; wherein the 3,4-epoxy moiety was selectively cleaved to introduce the alcohol-derived R moiety at C-4 as depicted by formula (XIII). The subsequent treatment of the reaction mixture with a suitable base, such as sodium methoxide in methanol (MeONa/MeOH), effected the formation of a 2,3-epoxy moiety with concurrent with loss of the tosylate at C-2 to afford a dianhydromannopyranose (XIV). The overall process is illustrated below in Reaction Scheme H.

Reaction Scheme H

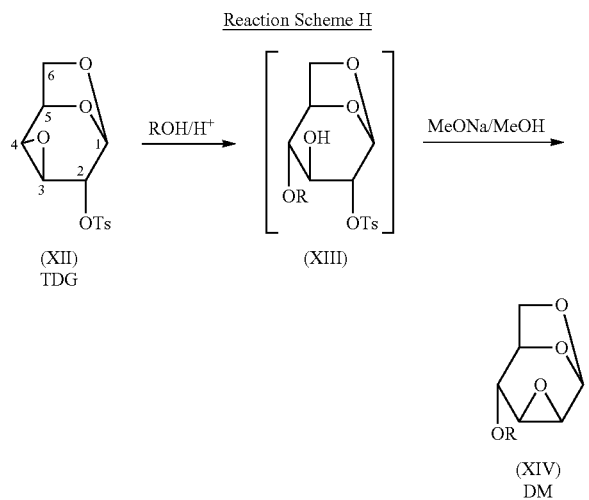

(XII)
TDG (XIII)

(XIV)
DM

Since the carbohydrate polyethers of the present invention can be produced in low molecular weights with functional end-groups, they can then be covalently bonded to a carrier surface in a brush fashion enabling rapid mass transport and high capacity. Also, such bonded, brush morphology allows for the production of stationary phases from mixtures of polymers with varied functional side groups to create chiral environments between adjacent functionalities along the polymer chains.

Embodiments of the present invention are useful in a wide variety of chromatographic methods including, but not limited to, gas chromatography, liquid chromatography, thin layer chromatography, supercritical fluid chromatography, capillary electrophoresis and continuous liquid preparative chromatography. In addition, it is also possible to perform membrane separations by affixing a suitably substituted carbohydrate polyether of the present inventions to a suitable membrane. The C2-C3 linked polyethers of 1,6:2,3-dianhydrohexopyranose derivatives of the present invention are particularly useful as the stationary phase for chiral chromatographic separations using techniques including high pressure liquid chromatography (HPLC), thin layer chromatography (TLC), capillary electrophoresis, micelle electroconductive chromatographic methods and preparative continuous liquid chromatography methods such as simulated moving bed chromatography.

In general, the carbohydrate polyethers of the present invention, which function as chromatography separation agents, are supported on a carrier. The size of the carrier may vary depending on the size of the column or plate to be used; generally the size is from about 1 g to 10 mm and preferably from 1μ to 300μ. The carrier is preferably porous with an average pore diameter of preferably 10 angstroms to 100μ and more preferably from 50 angstroms to 50,000 angstroms. The separating agent comprises from 1 to 100% by weight and more commonly from 5 to 50% by weight based on the carrier.

Suitable support materials for embodiments of the present inventions can be porous organic carriers or porous inorganic carriers. Suitable examples of the porous or macroreticular organic carriers includes, but are not limited to, organic polymers such as polyolefins, polystyrenes, poly(styrene-co-divinylbenzene) polyalkylacrylates, polyalkylmethacrylates, polyarylacrylates, polyarylmethacrylates, polyalkoxyacrylates, polyalkoxymethacrylates. polyacrylamides, copolymers or mixtures thereof. Such polymers may be crosslinked and are available in a variety of pore sizes and pore volumes.

Examples of suitable porous inorganic carriers include synthetic or natural substances such as silica, alumina, magnesia, titanium oxide, zirconia, glass, silicates, kaolin, metals and the like. Silica gel is a particularly preferable carrier material. To improve affinity of the carriers for the carbohydrate polyethers of the present invention, the carrier are subjected to a surface modification process such as silanization by treatment with an organosilane, plasma etching and the like.

The carbohydrate polyether compositions of the present inventions can be affixed to the carrier by either a chemical method or a physical method. In certain embodiments the C2-C3 linked polyethers of 1,6:2,3-dianhydrohexopyranose derivatives of the present invention with protected hydroxyl functionalities are deprotected and the resulting unprotected hydroxyl group is chemically bonded by known methods to a suitable carrier such as silica gel by formation of silyl ether linkages. In certain other embodiments carbohydrate polyethers of the present invention are to coated onto solid carriers and become affixed by physical interactions such as hydrogen bonding, Van der Waals interactions, electrostatic interactions and the like.

For use in certain chromatography applications the C2-C3 linked carbohydrate polyethers compositions of the present invention may be coated onto the interior surface of a suitable capillary column such as the fused silica capillary columns available from Restek Corporation, Bellefonte, Pa.

A variety of other polymers may be included in the stationary phases of the present invention. However, in preferred embodiments one or more C2-C3 linked polyethers of a 1,6:2,3-dianhydrohexopyranose derivatives is equal to or greater than 10% by weight of the total polymer content, i.e. equal to or greater than 10% by weight of the non-carrier content, of the stationary phase. In preferred embodiments the C2-C3 linked polyether of a 1,6:2,3-dianhydrohexopyranose derivative is 90 to 100% by weight of the total polymer content, i.e. 90 to 100% by weight of the non-carrier content, of the stationary phase.

In certain preferred embodiments, C2-C3 linked carbohydrate polyethers compositions and derivatives thereof the present invention are covalently coupled or crosslinked to from a self-supporting macroreticular network, which can function directly as chromatography stationary phases without the need for a carrier material. The required covalent coupling or crosslinking can be effected by any known method. For example, free-radical crosslinking can be effected by suitable chemical processes, suitable irradiation processes or combinations thereof. Suitable chemical free-radical initiators include azobisisobutyronitrile (AIBN), benzoyl peroxide and the like. Suitable high-energy irradiation sources include electron beam, ultra-violet (UV) and gamma irradiation. Additionally, crosslinking promoters such as bifunctional, trifunctional or tetrafunctional acrylates or methacrylate monomers and oligomers may be added to increase crosslinking efficiency and crosslink density. In other embodiments self-supporting macroreticular networks can be produced by the covalent coupling or crosslinking blends of carbohydrate polyethers of the present invention with suitable non-chromatographically active oligomers or polymers.

In certain other embodiments of the present invention a crosslinked or non-crosslinked C2-C3 linked carbohydrate polyether composition or derivatives thereof the present invention it is provided in the form of a self supporting hollow yarn or a film and is applied to a membrane separation process.

The following examples are presented as illustrations of embodiments of the present invention and should not be construed to limit the scope of the invention in any way.

Example 1

Synthesis of 1,6:3,4-dianhydro-2-O-p-toluenesulfonyl-β-D-galactopyranose (TDG) as Starting Material for D-mannopyranose Monomer Syntheses To a solution of 162 g of levoglucosan in 500 mL of anhydrous pyridine and 500 mL of anhydrous acetone was added 400 g of p-toluenesulfonylchloride in small portions. The resulting reaction mixture was stirred at ambient temperature for 72 hrs after which time 1 L of chloroform and 1 L of water were added. The aqueous layer was separated and extracted with chloroform (2×200 mL). The combined chloroform extract was washed sequentially with water (3×1000 mL), 10% $H_2SO_4$ at pH 4 (2×850 mL), concentrated $Na_2CO_3$ (300 mL), water (3×500 mL) and reduced in vacuo to syrup. The syrup was dissolved in 1000 mL of anhydrous chloroform and 200 mL of anhydrous methanol and to this solution was added a solution of sodium methoxide (prepared from 69 g of sodium in anhydrous methanol) at ambient temperature in small portions and the resulting reaction mixture was stirred for 12 hrs at ambient temperature. To this mixture was added 1000 mL of water and the aqueous layer was extracted with chloroform (2×200 mL). The combined chloroform extract was washed with water (3×800 mL), reduced in vacuo, crystallized and then recrystallized from methanol. Yield=178 g (60%) of white needles; MP=150° C.; [a]D=−37° ($CHCl_3$); single spot by thin layer chromatography (TLC).

Example 2

Synthesis of 1,6:2,3-dianhydro-4-O-benzyl-β-D-mannopyranose (BDM)

To a solution of 28 g of TDG in 100 mL of benzene and 72 mL of benzyl alcohol in a flask equipped with a Dean-Stark water separator was added 3 g of p-toluenesulfonic acid monohydrate. The reaction mixture was heated to reflux for 5 hrs, while the progress of the reaction was monitored by TLC ($CHCl_3$/acetone, 9/1, v/v). After the ring-opening reaction was complete 100 mL of chloroform was added followed by addition of the solution of 6.9 g of sodium in 100 mL of anhydrous methanol and the progress of the reaction was monitored by TLC. After the ring-closing reaction was complete, chloroform (50 mL) and water (200 mL) were added and the organic layer was separated, extracted with water and reduced in vacuo to syrup. The syrup was distilled under high vacuum and crystallized from diethyl ether and recrystallized from anhydrous ether. Yield=14.43 g (62%); colorless crystals MP=60° C.; single spot on TLC; $[\alpha]_D$=−28° ($CHCl_3$).

Example 3

Synthesis of 1,6:2,3-dianhydro-4-O-decyl-β-D-mannopyranose (DDM)

To a solution of 30 g of TDG in 60 mL of benzene and 90 mL of 1-decanol in a flask equipped with a Dean-Stark water separator was added 3.1 g of p-toluenesulfonic acid monohydrate. The reaction mixture was heated to reflux for 5 hrs, while the progress of the reaction was monitored by TLC ($CHCl_3$/acetone, 9/1, v/v). After the ring-opening reaction was complete 100 mL of chloroform and 28 mL of methanol was added followed by addition of the solution of 3.5 g of sodium in 56 mL of anhydrous methanol and the progress of the reaction was monitored by TLC. After the ring-closing reaction was complete, chloroform (100 mL) and water (100 mL) was added and the organic layer was separated, extracted with water, and reduced in vacuo to syrup. Fractional distillation of syrup in high vacuum yielded 23.4 g (83%) of colorless viscous liquid, pure by HPLC., single spot on TLC; [α]D=−24.8° (CHCl3). Structure identification: $^{13}C/^{1}H$ HMQC NMR spectra. This (DDM) monomer and the polymer synthesized there from were soluble in hexane.

Example 4

Synthesis of 1,6:2,3-dianhydro-4-O-(2-methoxyethyl)-β-D-mannopyranose (MEDM)

To a solution of 30 g of TDG in 60 mL of benzene and 32 mL of 2-methoxyethanol in a flask equipped with a Dean-Stark water separator was added 3.1 g of p-toluenesulfonic acid monohydrate. The reaction mixture was heated to reflux for 6 hrs, while the progress of the reaction was monitored by TLC ($CHCl_3$/acetone, 9/1, v/v). After the ring-opening reaction was complete 100 mL of chloroform and 28 mL of methanol was added followed by addition of the solution of 3.5 g of sodium in 56 mL of anhydrous methanol and the progress of the reaction was monitored by TLC. After the ring-closing reaction was complete, chloroform (100 mL) and water (100 mL) was added and the organic layer was separated, water layer extracted with chloroform, combined and reduced in vacuo to syrup. Fractional distillation of syrup in high vacuum yielded 14.5 g (71%) of colorless viscous liquid, pure by HPLC, single spot on TLC; [α]D=−34.6° ($CHCl_3$). Structure identification: $^{13}C/^{1}H$ HMQC NMR spectra. This (MEDM) monomer and the polymer synthesized there from were soluble in water.

Example 4a

Synthesis of 1,6:2,3-dianhydro-4-O-(2-(2-(2-methoxyethoxy)ethoxy)ethyl)-β-D-mannopyranose (monomer T)

To a solution of 30 g of TDG in 60 mL of benzene and 79 mL of triethylene glycol monomethyl ether in a flask equipped with a Dean-Stark water separator was added 3.1 g of p-toluenesulfonic acid monohydrate. The reaction mixture was heated to reflux for 10 hrs, while the progress of the reaction was monitored by TLC ($CHCl_3$/acetone, 9/1, v/v). After the ring-opening reaction was complete 28 mL of methanol was added followed by addition of the solution of 3.47 g of sodium in 56 mL of anhydrous methanol and the progress of the reaction was monitored by TLC. After the ring-closing reaction was complete, methylene chloride (100 mL) and water (200 mL) was added and the organic layer was separated, water layer extracted with $CH_2Cl_2$, (20 mL×5), combined and reduced in vacuo to syrup. Fractional distillation of syrup in high vacuum yielded 16.7 g (57%) of colorless viscous liquid, pure by HPLC, single spot on TLC; Structure identification: $^{13}C/^1H$ HMQC NMR spectra. Monomer T is soluble in water.

Example 5

Synthesis of 1,6:2,3-dianhydro-4-O-neopentyl-β-D-mannopyranose (NPDM)

To a solution of 30 g of TDG in 60 mL of benzene and 50 g of 2,2-dimethyl-1-propanol in a flask equipped with a Dean-Stark water separator was added 3.1 g of p-toluenesulfonic acid monohydrate. The reaction mixture was heated to reflux for 6 hrs, while the progress of the reaction was monitored by TLC ($CHCl_3$/acetone, 9/1, v/v). After the ring-opening reaction was complete 100 mL of chloroform and 28 mL of methanol was added followed by addition to the solution of 3.5 g of sodium in 56 mL of anhydrous methanol and the progress of the reaction was monitored by TLC. After the ring-closing reaction was complete, chloroform (100 mL) and water (100 mL) was added and the organic layer, the organic layer was separated, extracted with water, and reduced in vacuo to syrup. Distillation of the syrup in vacuum yielded 16.8 g (78%) of white solid. The recrystallization from ether/hexane yielded 10.3 g of colorless crystals, single spot on TLC; $[\alpha]D=-37.5°$ ($CHCl_3$). Structure identification: $^{13}C/^1H$ HMQC NMR spectra. The polymers of this (NPDM) monomer are insoluble in all common solvents and precipitate during polymerization.

Example 5a

Synthesis of 1,6:2,3-dianhydro-4-O-benzyl-β-D-mannopyranose (BDM or Monomer B)

To a solution of 28 g of TDG in 100 mL of benzene and 72 mL of benzyl alcohol in a flask equipped with a Dean-Stark water separator was added 3 g of p-toluenesulfonic acid monohydrate. The reaction mixture was heated to reflux for 5 hrs, while the progress of the reaction was monitored by TLC ($CHCl_3$/acetone, 9/1, v/v). After the ring-opening reaction was complete 100 mL of chloroform was added followed by addition of the solution of 6.9 g of sodium in 100 mL of anhydrous methanol and the progress of the reaction was monitored by TLC. After the ring-closing reaction was complete, chloroform (50 mL) and water (200 mL) were added and the organic layer was separated, extracted with water and reduced in vacuo to syrup. The syrup was distilled under high vacuum and crystallized from diethyl ether and recrystallized from anhydrous ether. Yield=14.43 g (62%); colorless crystals MP=60° C.; single spot on TLC; $[\alpha]_D=-28°$ ($CHCl_3$).

Example 5b

Synthesis of 1,6:2,3-dianhydro-4-O-decyl-β-D-mannopyranose (DDM or Monomer Dc)

To a solution of 30 g of TDG in 60 mL of benzene and 90 mL of 1-decanol in a flask equipped with a Dean-Stark water separator was added 3.1 g of p-toluenesulfonic acid monohydrate. The reaction mixture was heated to reflux for 5 hrs, while the progress of the reaction was monitored by TLC ($CHCl_3$/acetone, 9/1, v/v). After the ring-opening reaction was complete 100 mL of chloroform and 28 mL of methanol was added followed by addition of the solution of 3.5 g of sodium in 56 mL of anhydrous methanol and the progress of the reaction was monitored by TLC. After the ring-closing reaction was complete, chloroform (100 mL) and water (100 mL) was added and the organic layer was separated, extracted with water, and reduced in vacuo to syrup. Fractional distillation of syrup in high vacuum yielded 23.4 g (83%) of colorless viscous liquid, pure by HPLC., single spot on TLC; $[\alpha]D=-24.8°$ (CHCl3). Structure identification: $^{13}C/^1H$ HMQC NMR spectra. This (DDM (Dc)) monomer and the polymer synthesized there from were soluble in hexane.

Example 6

Purification of Solvents

Polymerization grade tetrahydrofuran (THF) was prepared by refluxing dry THF over sodium/benzophenone until the solution develops a deep blue color. The THF was then distilled and stored in the dry box or over potassium/sodium alloy in a dry box. Potassium/sodium alloy can be prepared in a dry box by melting K and Na (70/30 w/w) and then separating pure liquid alloy from oxides by passing it through a capillary tube.

Example 7

Preparation of Anionic Polymerization Initiators

Monofunctional and trifunctional anionic initiators were prepared by the reactions of 3,3-Diethoxy-1-propanol or 2-butoxyethanol or 1,3,5-benzenetrimethanol in THF solution with an excess of potassium metal. The initiators thus prepared were stored over potassium metal in a dry box or in a dry box alone. The concentration of initiator in solution could be determined by reverse titration.

Example 8

Polymerization of the DM trgel Monomers

The DM trgel monomers as prepared by the methods exemplified in Examples 1-5 above were converted to polymers by the anionic polymerization reaction as illustrated in Reaction Scheme A and the physical properties of homopolymers of differing monomers are presented in Table 1. With reference to Table 1 it should be noted that all of the resulting polymers have very low poly dispersity (Mw/Mn). The monomers and polymers wherein R=2-methoxyethyl (M) and R=2-(2-methoxyethoxyethyl)(D) and 2-(2-(2-Metoxyethoxy)ethoxy) ethyl (T) are water-soluble while the polymers wherein R=neopentyl (N) and R=isopropyl(Ip) are insoluble in all common solvents and the polymers wherein R=n-octyl(Oc) and R=n-decyl(Dc) are soluble in hexane. All trgel monomers can be copolymerized randomly or in blocks. Copolymerization of water-soluble and water insoluble monomers results in polymers with controlled solubility in water, including gel forming polymers. Water-soluble polymers are particularly useful in biological applications such as surface protection from non-specific adsorption. The data also illustrates that the glass transition temperature (Tg) of polymers with alkyl substituents decreases as the alkyl chain length increases. Solutions of DM trgel polymers wherein R=isobutyl in solvents, such as chloroform and THF exhibit non-newtonian behavior (shear dependent viscosity). The DM trgel polymers wherein R=2-methoxyethyl or R=2-(2-methoxyethoxyethyl) show lower critical solution temperature (LCST) behavior.

Mn) remained substantially constant. Trgel-D polymers are soluble in water. Polymers of monomer T were obtained in a similar way. Trgel-T polymers are soluble in water.

TABLE 1

| R | Monomer $[\alpha]_D$ (deg) | Polymer $[\alpha]_D$ (deg) | Polymer Tg/Tm (°C.) | Polymer Solubility[A] | Polymer Mn | Polymer Mw/Mn | DP |
|---|---|---|---|---|---|---|---|
| 1 methyl | −44.70 | −73.0 | 163.6 | R | 65,835 | 1.130 | 417 |
| 2 allyl | −35.90 | −59.6 | n/m | R | 48,896 | 1.107 | 266 |
| 3 n-pentyl | −33.35 | −72.3 | 84.1 | R | 94,497 | 1.040 | 442 |
| 4 n-hexyl | −30.46 | −71.6 | 65.0 | R | 60,314 | 1.030 | 265 |
| 5 n-octyl | −28.34 | −67.5 | 35.2 | R, H | 55,786 | 1.030 | 218 |
| 6 n-decyl | −24.82 | −59.2 | 13.5 | R, H | 43,783 | 1.046 | 154 |
| 7 2-methoxyethyl | −34.58 | −50.4 | 89.9 | R, W, M | 74,057 | 1.07 | 366 |
| 8 2-(2-methoxyethoxyethyl) | −26.36 | −41.0 | 17.5 | R, W, M | 24,667 | 1.030 | 100 |
| 9 isoamyl | −34.49 | −75.5 | 115.9 | R | 100,539 | 1.070 | 469 |
| 10 isobutyl | −35.20 | −67.0 | 157.1 | Temp Dep.[B] | 145,050 | 1.13 | 725 |
| 11 benzyl | −28.30 | −41.0 | 106.6 | R | 120,788 | 1.06 | 516 |
| 12 neopentyl | −37.50 | n/m | 160.4 | insoluble | n/m | n/m | n/m |
| 13 isopropyl | −36.72 | n/m | n/m | insoluble | n/m | n/m | n/m |

[A] R = tetrahydrofuran, chloroform, methylene chloride, pyridine and similar polar organic solvents; H = heptane or other non-polar organic solvents; W = water; and M = methanol or other alcohols.

Example 9

Polymers of 1,6:2,3-dianhydro-4-O-(2-methoxyethyl)-β-D-mannopyranose (MEDMM): trgel-M A series of water-soluble polymers of the MEDM monomer of example 4 was prepared by the synthesis route illustrated in Reaction Scheme A by initiation with potassium 3,3-diethoxypropanolate, wherein the ratio of monomer/initiator was varied from 9 to 643. Results are presented in Table 2, wherein these data clearly show that the molecular weight (Mn) was conveniently controlled by the initial ration of monomer/initiator while the poly dispersity index (Mw/Mn) remained substantially constant. Trgel-M polymers are soluble in water.

TABLE 2

| Run No. | Monomer/Init. | Mn | Mw/Mn (PDI) | Deg. Polyn. |
|---|---|---|---|---|
| 1 | 9 | 2,735 | 1.195 | 14 |
| 2 | 10 | 2,860 | 1.112 | 14 |
| 3 | 19 | 4,456 | 1.089 | 22 |
| 4 | 20 | 5,351 | 1.133 | 26 |
| 5 | 43 | 8,188 | 1.070 | 41 |
| 6 | 67 | 12,257 | 1.055 | 61 |
| 7 | 120 | 18,106 | 1.041 | 90 |
| 8 | 216 | 29,264 | 1.037 | 145 |
| 9 | 358 | 48,266 | 1.044 | 239 |
| 10 | 643 | 74,057 | 1.071 | 366 |

Example 9a

Polymers of 1,6:2,3-dianhydro-4-O-(2-(2-methoxyethoxyethyl)-β-D-mannopyranose (D): trgel-D A series of water-soluble polymers of the D monomer of example 4 was prepared by the synthesis route illustrated in Reaction Scheme A by initiation with potassium 3,3-diethoxypropanolate. Results are presented in Table 2a, wherein these data clearly show that the molecular weight (Mn) was conveniently controlled while the poly dispersity index (Mw/

TABLE 2a

| Polymer ID | Mn | Mw | Mw/Mn |
|---|---|---|---|
| TRGEL-D-3 | 11257 | 11800 | 1.048 |
| TRGEL-D-4 | 13793 | 14255 | 1.033 |
| TRGEL-D-2 | 24667 | 25498 | 1.034 |
| TRGEL-D-1 | 26079 | 26675 | 1.023 |
| TRGEL-D-28 | 28492 | 31460 | 1.104 |
| TRGEL-D-14 | 46657 | 49069 | 1.052 |
| TRGEL-D-19 | 54641 | 57037 | 1.044 |
| TRGEL-D-12 | 55138 | 58551 | 1.062 |
| TRGEL-D-13 | 57891 | 62097 | 1.073 |
| TRGEL-D-18 | 59601 | 64030 | 1.074 |
| TRGEL-D-17 | 63526 | 67699 | 1.066 |
| TRGEL-D-16 | 67616 | 71643 | 1.060 |
| TRGEL-D-25 | 73155 | 76928 | 1.052 |
| TRGEL-D-21 | 74140 | 77750 | 1.049 |
| TRGEL-D-11 | 74918 | 78154 | 1.043 |
| TRGEL-D-22 | 80248 | 84718 | 1.056 |
| TRGEL-D-24 | 85443 | 89700 | 1.050 |
| TRGEL-D-23 | 90049 | 94483 | 1.049 |
| TRGEL-D-26 | 97764 | 103494 | 1.059 |
| TRGEL-D-29 | 103144 | 108336 | 1.050 |
| TRGEL-D-30 | 129074 | 140714 | 1.090 |
| TRGEL-D-27 | 130258 | 137473 | 1.055 |
| Average | | | 1.056 |
| SD | | | 0.018 |
| SD/Average | | | 1.7% |

Example 10

1,6:2,3-dianhydro-4-O-pentyl-β-D-mannopyranose (PDM)

A series of polymers of the PDM monomer was prepared by the synthesis route illustrated in Reaction Scheme A by initiation with potassium 3,3-diethoxypropanolate, wherein the ratio of monomer/initiator was varied from 20 to 948. Results are presented in Table 3, wherein these data clearly show that the molecular weight (Mn) was conveniently controlled by the initial ration of monomer/initiator while the poly dispersity index (Mw/Mn) remained substantially constant.

TABLE 3

| Run No. | Monomer/Init. | Mn | Mw | Mw/Mn (PDI) | Deg. Polyn. |
|---|---|---|---|---|---|
| 1 | 20 | 8531 | 9210 | 1.080 | 40 |
| 2 | 40 | 13857 | 14599 | 1.054 | 65 |
| 3 | 99 | 20752 | 21630 | 1.042 | 97 |
| 4 | 198 | 31868 | 33174 | 1.041 | 149 |
| 5 | 512 | 63422 | 65606 | 1.034 | 296 |
| 6 | 948 | 85840 | 89028 | 1.037 | 401 |

Example 11

Synthesis of poly(2-3)-1,6-anhydro-4-O-benzyl-b-D-glucopyranose (pBDM trgel B)

Figure 2:
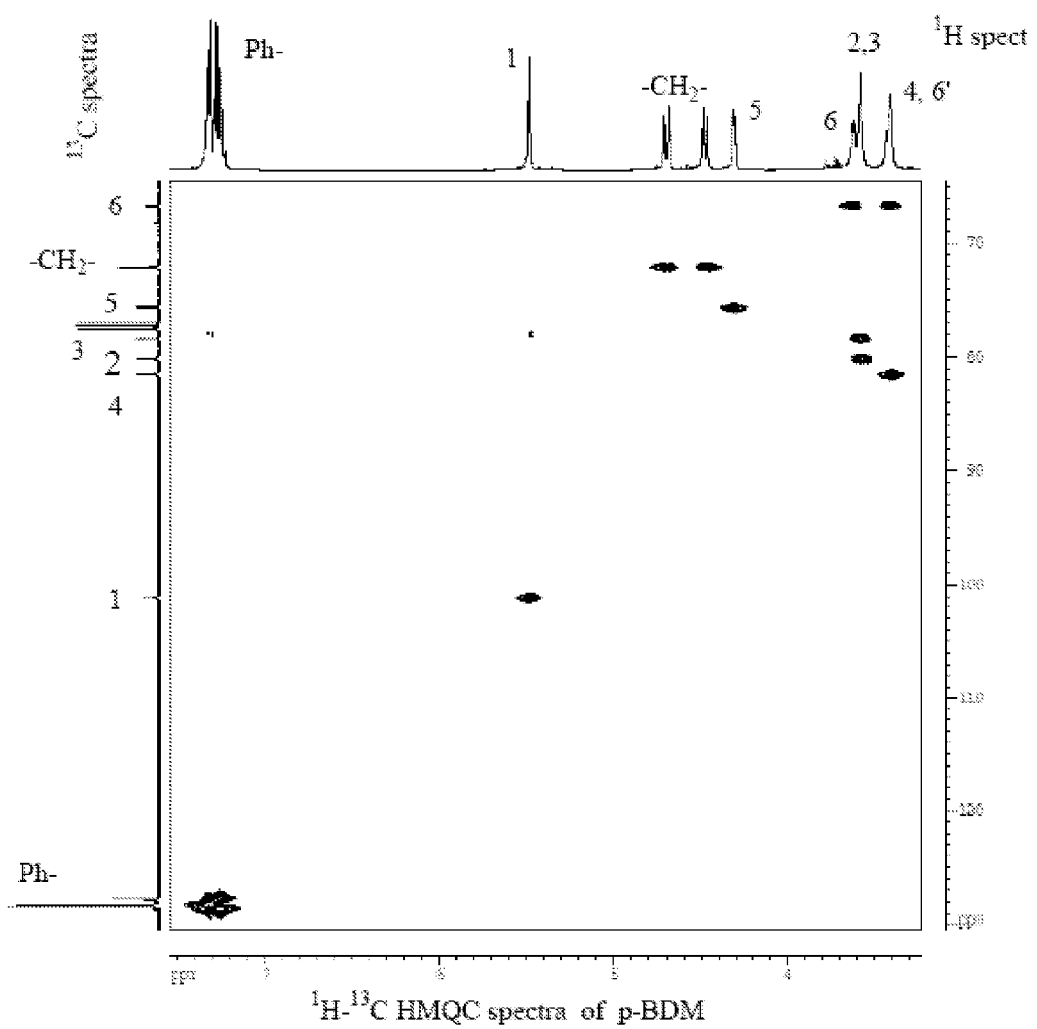
FIG. 2 presents the $^1H$-$^{13}C$ HMQC spectrum of poly(2-3)-1,6-anhydro-4-O-benzyl-β-D-glucopyranose.

All steps were performed in an argon-filled dry box. In a sealable vial, 1.00 g of BDM (B) monomer was dissolved in 1.0 g of THF followed by addition of 0.058 g of a solution of potassium 3,3-diethoxypropanolate in THF. The vial was capped, sealed (crimped) and the reaction mixture was incubated at 60° C. for 12 hrs. The reaction mixture was then diluted with 2 mL of CHCl3 and the polymer was precipitated into 50 mL of methanol. No residual monomer was found by TLC and GPC in the polymerization mix. Polymer was isolated by centrifugation and then dried in vacuum at ambient temperature. Yield: 1.0 g (100%); Mn=49798, Mw=89,410. The stereospecificity and regiospecificity of the polymer was determined to be 100% by $^{13}C$ and $^{1}H$ NMR spectroscopy. Full peak assignment in NMR spectra was accomplished via $^{1}H$—$^{1}H$ COSY and $^{1}H$—$^{13}C$ HMQC techniques. All NMR spectra were obtained on Bruker Cryo500 instrument. Polymer structure was confirmed by $^{13}C$ and $^{1}H$ nmr peak assignments. The $^{1}H$—$^{13}C$ HMQC spectra are presented in FIG. 2.

Example 12

Synthesis of poly(2-3)-1,6-anhydroD-glucopyranose (pDM)

In a flask, 1.0 g of pBDM polymer from example 11 was dissolved in 18 g of THF and added in small portions to the solution of 89 mg of lithium metal in 65 g of THF containing 2.2 g of naphthalene at −25 to −26° C. over 13 min. The reaction mixture was stirred at −28 to −18° C. for 95 min, 6.5 mL of 14% NH4Cl solution was added, white precipitate was washed with THF and water and dried in vacuo. Yield=0.595 g (97% theory). This polymer is insoluble in water, THF and CHCl3, and is soluble in DMF.

Example 13

Poly(2-3)-1,6-anhydro-4-O-(3,5-dimethylphenylcarbamate)-β-D-glucopyranose (DMPC)

In a flask 0.593 g of pDM polymer from example 4b was stirred with 2.09 mL of 3,5-dimethylphenyl isocyanate and 10.5 mL of dry pyridine at 80° C. for 24 hrs. The solution was cooled to ambient temperature and polymer precipitated into 50 mL of methanol, collected, dissolved in 5 mL of chloroform and re-precipitated in methanol, dried in vacuo at ambient temperature. Yield=1.05 g (97% theory).

Example 14

Preparation of (pDGDM-pODM-pDGDM) Triblock Polymers

An ABA triblock polymer (pDGDM-pODM-pDGDM) was synthesized from 0.4 g of DGDM monomer which was mixed with 0.5 g of THF and 0.105 g 100 mM solution of potassium 2-butoxyethanolate and incubated at 60° C. for 6 hrs, then 0.4 g of ODM monomer was added and mixture was incubated for an additional 6 hrs at 60° C., then 0.4 g of DGDM monomer was added and reaction mixture was incubated at 60° C. for 6 hrs. Terpolymer was precipitated in 50 mL of ether. Yield=1.0 g, Mn=38,149, Mw=40,171. This block copolymer formed an opaque solution in water.

Example 15

Preparation of (pODM-pDGDM-pODM) Triblock Polymers

An ABA triblock polymer (pODM-pDGDM-pODM) was synthesized from 0.4 g of ODM monomer which was mixed with 0.5 g of THF and 0.105 g 100 mM solution of potassium 2-butoxyethanolate and incubated at 60° C. for 6 hrs, then 0.4 g of DGDM monomer was added and mixture was incubated for an additional 6 hrs at 60° C. followed by addition of 0.4 g of ODM monomer was added, incubated at 60° C. for 6 hrs and terpolymer precipitated in 50 mL of ether. Polymer formed an opaque solution in hexane. Yield 0.97 g, Mn=51.699, Mw=53.554.

Example 16

Poly(2-3)-1,6-bis(3,5-dimethylphenylcarbamate)-4-O-benzyl-β-D-glucopyranose (bis-DMPC)

To a solution of 0.56 g pBDM polymer in 2.87 mL of acetic anhydride was added 10 uL of concentrated sulfuric acid. The reaction mixture was incubated at ambient temperature for 1 hr and then poured into 100 mL of ice/water mix. Polymer precipitate was collected, washed with water and dried in vacuo. Yield=0.59 g (68%): poly(2-3)-1,6-di-O-acetyl-4-O-benzyl-D-glucopyranose. This polymer was dissolved in 2.5 mL of THF, a solution of 0.14 g of sodium in 2.0 ml of methanol was added and reaction mixture was incubated at ambient temperature for 1 hr, the polymer precipitate was collected and washed with methanol and ether. Yield=0.27 g (65%): poly(2-3)-4-O-benzyl-D-glucopyranose. A 0.27 g portion of this polymer was stirred with 0.49 mL of 3,5-dimethylphenyl isocyanate and 5.4 mL of dry pyridine at 80° C. for 24 hrs. The solution was cooled to ambient temperature and polymer precipitated in 50 mL of methanol. The precipitate was dissolved in 5 mL of chloroform and re-precipitated in methanol and dried in vacuo at ambient temperature. Yield=0.6 g (90%): poly(2-3)-1,6-bis(3,5-dimethylphenylcarbamate)-4-O-benzyl-D-glucopyranose (bis-DMPC).

Example 17

Random Copolymer: pDGDM-pADM

In a sealed vial 0.5 g of DGDM (1,6:2,3-dianhydro-4-(2-(2-methoxyethoxyethyl)-β-D mannopyranose), 0.03 g of ADM (1,6:2,3-dianhydro-4-O-allyl-β-D mannopyranose), 0.5 mL of THF and 0.193 g of 210 mmolar dipotassium 3-thiolate-1-propionate in THF are mixed and incubated at 60 C for 48 hrs. The resulting polymer is precipitated into methanol collected and dried.

Example 18

Initiation with Potassium 2-Butoxy Ethanolate and Termination with Succinic Anhydride In a vial 0.5 g of ODM (1,6:2,3-dianhydro-4-O-octyl-β-D mannopyranose), 0.5 mL of THF and 0.175 g of 200 mmolar of potassium 2-butoxy ethanolate in THF were mixed and incubated at 60° C. for 12 hrs. The polymerization reaction was terminated by addition of 0.175 g of 400 mmolar succinic anhydride solution in THF. The resulting polymer was precipitated from methanol. Yield=0.36 g; Mn=27,402, Mw/Mn (PD)=1.048

Example 19

Introduction of Carboxylic End-Groups (a) To a sealable vial was added 0.5 g of 1,6:2,3-dianhydro-4-O-pentyl-β-D mannopyranose (PDM), 0.5 mL THF and 0.193 g of 210 mmolar dipotassium 3-thiolate-1-propionate in THF. Reactants were mixed, vial was sealed and reaction mixture was incubated at 60° C. for 48 hrs. The resulting polymer was precipitated into methanol. Yield=0.101 g; Mn=23,969; Mw/Mn (PD)=1.085

(b) To a sealable vial was added 0.5 g of 1,6:2,3-dianhydro-4-O-octyl-β-D mannopyranose (ODM), 0.5 mL of THF and 0.175 g of 200 mmolar of potassium 2-butoxy ethanolate in THF. Reactants were mixed, vial was sealed and reaction mixture was incubated at 60° C. for 12 hrs. The reaction was terminated by addition of 0.175 g of 400 mmolar succinic anhydride solution in THF. The resulting polymer was precipitated from methanol. Yield=0.36 g; Mn=27,402, Mw/Mn (PD)=1.048

Example 20

Fabrication of Chromatography Coated Stationary Phase and Column

Figure 3:
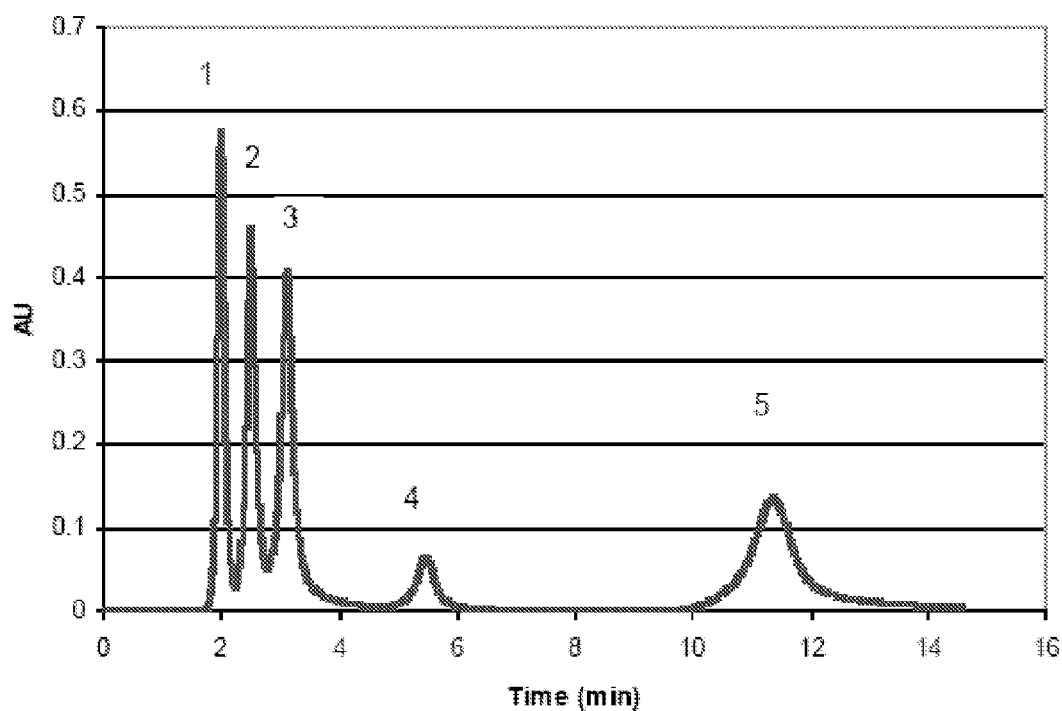
FIG. 3 presents the chromatogram of test mixture separated on a stationary phase consisting of 15 wt % poly(2-3)-1,6-anhydro-4-O-octyl-β-D-glucopyranose on silica beads.

A 150 mm×4.6 mm packed chromatography column was fabricated with a stationary phase consisting of 15% poly(2-3)-1,6-anhydro-4-O-octyl-β-D-glucopyranose (p-ODM, 60 kDalton) coated onto spherical silica beads (10 micron particle diameter and 1000 Å pore diameter from Daisogel, Daiso Co. LTD, Osaka Japan). In a round bottom flask 2.5 g of silica, 0.38 g of ODM, and 8 ml of THF were mixed. The THF was removed in vacuo and the resulting powder was slurry packed under high pressure into a chromatography column. Utilizing this column a test mixture of uracil, acetophenone, methyl benzoate, toluene and naphthalene was separated using a mobile reverse phase of 20/80 acrylonitrile/water at 1.0 ml/min. The chromatogram obtained is presented in FIG. 3.

Example 21

Fabrication of Chromatography Column with Bonded Stationary Phase

Figure 4:
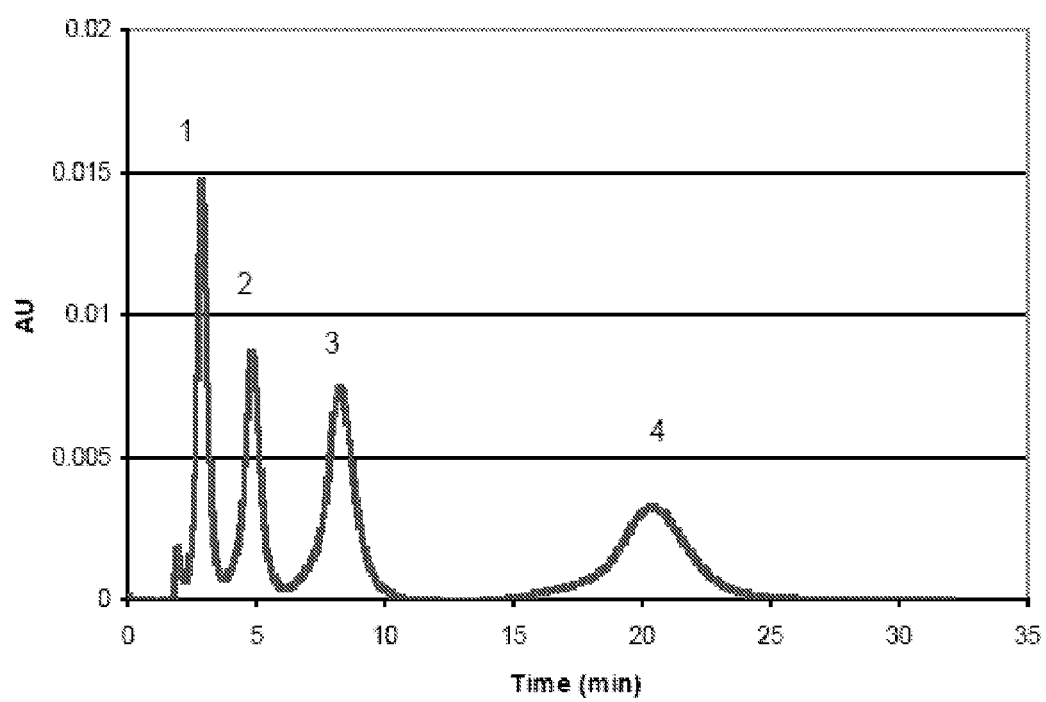
FIG. 4 presents the chromatogram of test mixture separated on a stationary phase consisting of succinic anhydride-terminated poly(2-3)-1,6-anhydro-4-O-octyl-β-D-glucopyranose on silica beads.

To a solution of 0.59 g of succinic anhydride-terminated poly(2-3)-1,6-anhydro-4-O-octyl-β-D glucopyranose (pODM, Mn=6487), 0.0157 g of N-hydroxysuccinimide (NHS) and 0.00056 g of DMAP (dimethylaminopyridine) in 10 mL of acetonitrile/pyridine (9/1 vol/vol) was added 0.0121 g of diisopropyl carbodiimide (DIPC) and the mixture was incubated at ambient temperature for 3 hrs. To this solution was added 2.5 g of aminopropylated silica (pore size=100 A, particle size=30 microns, organic content=C 6.91%, H 1%, N 2.65%) was added and the resulting slurry was shaken overnight at ambient temperature. The solids were recovered on a glass filter, washed extensively with water, DMF and acetone, dried in vacuo. The resulting materials had an organic content of C 15.01%, H 2.75% and N 2.30%. This silica-bonded phase was used for HPLC column packing FIG. 4 presents the chromatogram of a reverse phase (1.0 ml/min 3/7 MeCN/$H_2O$) separation of a test mixture consisting of benzene, dimethylphthalate, toluene, and naphthalene obtained with this column.

Example 22

Fabrication of GC Capillary Column

A random block copolymer (pDGDM-pADM) with 5 mole % allyl monomer obtained as in Examples 17 is dissolved in methylene chloride at 0.1-1% wt./wt. Fused silica capillary columns (supplied by Restek Corporation, Bellefonte, Pa.) are derivatized by treatment with 3-glycidoxypropyltrimethoxysilane and with methyltrimethoxysilane by standard methods. The surface treated columns are vacuum back-filled with the polymer solution to which a radical initiator or transition metal carbene complex a such Grubbs catalyst is added. Methylene chloride is then evaporated by the application of vacuum applied from both ends of the column.

Example 23

Fabrication of Chiral Chromatography Medium

Figure 5:
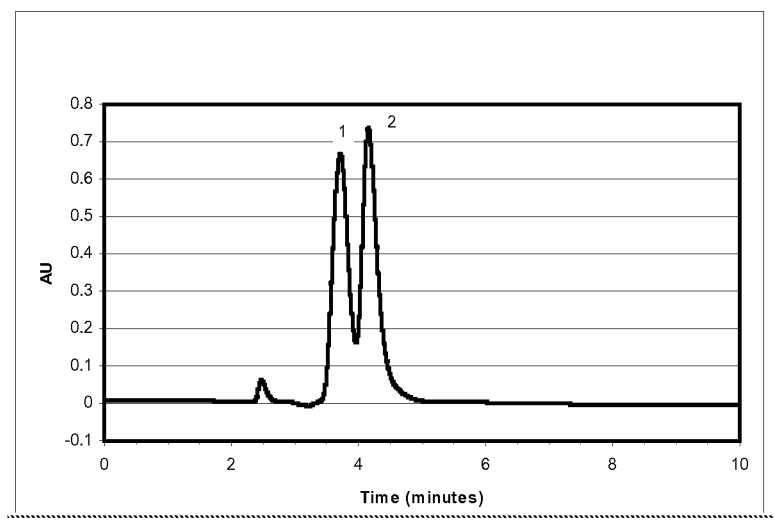
FIG. 5 presents a chromatogram illustrating the resolution of racemic Tröger's base on a stationary phase consisting of the 10 wt % poly(2-3)-1,6-anhydro-4-O-(3,5-dimethylphenylcarbamate)-β-D-glucopyranose coated onto silica beads.

A 250×3.0 mm chromatography column was fabricated using a chiral stationary phase consisting of 10 wt % poly(2-3)-1,6-anhydro-4-O-(3,5-dimethylphenylcarbamate)-β-D-glucopyranose (DMPC), as prepared in example 13 from poly(2-3)-1,6-anhydro-D-glucopyranose (pDM) (Mw=50 kDalton), coated on silica beads (5 mm particle diameter and 300 Å pore-diameter, surface treated with aminopropyltriethoxysilane). A slurry of the polymer and the silica beads in THF was prepared followed by removal of the THF to afford the coated silica beads. The coated silica beads were then submersed in heptane and annealed for 1 hour at 80° C. followed by slurry packing into the column with the aid of a high-pressure pump. A 0.03% solution of racemic Tröger's base was resolved on this column by HPLC utilizing a mobile phase of 10.0/89.9/0.1 isopropanol/heptane/trifluoroacetic acid at a flow rate of 0.5 ml/min. The structure of Tröger's base and chromatogram obtained are presented in FIG. 5. Under these conditions, Tröger's base was resolved with a=1.4, Rs=1.0.

The chromatographic column was further tested with a flow rate of 0.4 ml/min and with the following results.

| Compound | Mobile Phase | $k'_1$[a] | $k'_2$[b] | a[c] | Rs[d] |
|---|---|---|---|---|---|
| Troger's Base | Heptane:IPA 95:05 | 0.34 | 0.45 | 1.41 | 1.61 |
| Benzoin | Heptane:IPA 90:10 | 1.55 | 1.77 | 1.14 | 1.31 |

[a](retention time of a peak/dead time) − 1 for first peak, corresponding to the first enantiomer to elute.
[b](retention time of a peak/dead time) − 1 for second peak, corresponding to the second enantiomer to elute.
[c]ratio k'$_2$/k'$_1$.
[d](difference in retention time between peaks)/(average width of both peaks.)

Example 24

Synthesis Gel Point of a Reverse Thermal Gelling (RTGTRGel) Copolymer 27.8 mg of a pMDM/DGDMt-OD copolymer, MW ~33 k (30 32 mol % DGDM), was dissolved in 278 uL $H_2O$ at 5° C. The solution remained a free-flowing liquid at ambient temperature for at least 1 hr, whereupon heating the solution to ~30-40° C. converted the solution to a non-flowing gel. The gel remained non-flowing and transparent at ambient temperature for more than 4 hrs. and at 26° C. for 8 hrs. At 19° C. the gel became a slow flowing non-viscous liquid. Upon heating the solution to ~60° C. the gel separated and the polymer precipitated from the solution.

Example 24a

Gel Point of a Reverse Thermal Gelling (TRGel) Terpolymer T-OMD-120.1

38.4 mg of a (t-OMD) (57.4/5.0/37.6 mole %) terpolymer, MW ~36 k, was dissolved in 366 mg of phosphate buffered saline (PBS) at 5° C. The solution remained a free-flowing non viscous liquid at ambient temperature for at least 24 hr, whereupon heating the solution to 35.5° C. instantly converted the solution to a non-flowing gel. With cooling the gel became a non viscous liquid again. The conversion to a gel and then back to liquid was repeated for 5 times. After that the gel was stable while incubated at 37° C. for at least 7 days. Upon heating the solution to ~70° C. the gel separated and the polymer precipitated from the solution.

Example 25

Synthesis of 1,6:2,3-dianhydro-4-O-2-(2-Methoxyethoxy)ethyl-β-D-mannopyranose (DGDM monomer)

41.7 g of TDG (22) was dissolved in 83 mL of benzene and 82 mL of diethylene glycol methyl ether, 4.3 g of p-toluenesulfonic acid monohydrate was added and reaction was refluxed with Dean-Stark apparatus for 5 hrs. The progress of the reaction was monitored by TLC ($CHCl_3$/Acetone, 9/1, v/v). When ring-opening reaction was complete, 39 mL of methanol was added followed by the addition of the solution of 4.83 g of sodium in 77 mL of anhydrous methanol. The progress of the reaction was monitored by TLC. When ring closure reaction was complete, chloroform (50 mL) and water (200 mL) were added, organic layer separated, water layer extracted with CHCl3, combined, and solvent was removed in vacuo to afford a viscous liquid residue. The residue was dissolved in water, filtered, concentrated and distilled under high vacuum. Fractional vacuum distillation yielded 26 g of DGDM (75%), as a colorless liquid, single peak by HPLC and TLC. [a]D=−26.4° ($CHCl_3$).

Example 26

Synthesis of an RTG TRGel poly(2-3)-1,6-anhydro-4-O-methyl/co-2-(2-Methoxyethoxy)ethyl-β-D-glucopyranose copolymer, t-OD A reaction mixture containing, 0.422 g MDM; 0.310 g DGDM, 0.7 g THF, and 0.164 g of a 57 mM solution of potassium 2-butoxyethoxylate in THF was sealed in a vial and incubated at 60° C. for 12 hrs in an argon-filled glove box. The polymerization mixture was then diluted with 2 mL of THF and polymer was precipitated into 50 mL of ether, centrifuged and dried in vacuo. Product recovery was 0.730 g (99.7%). No residual monomer was found in the polymerization mix by GPC. Mn=32,613, Mw=33,945, Mw/Mn=1.041. A 100% stereospecificity and regiospecificity of the polymer was established by $^{13}C$ and $^1H$ NMR spectroscopy. Full peak assignments in NMR spectra were accomplished by $^1H$—$^1H$ COSY and $^1H$—$^{13}C$ HMQC. Polymer product was soluble in cold water and formed a non-flowing gel at and above 30° C. at concentrations of 5% and 10% or greater. Other copolymers of MDM and DGDM may be readily synthesized by the same or similar procedures.

Example 26a

Synthesis of an RTG poly(2-3)-1,6-anhydro-4-O-methyl/co-2-(2-Methoxyethoxy)ethoxy/co-2-Methoxy-β-D-glucopyranose terpolymer, t-OMD A reaction mixture containing, 0.482 g of monomer O (MDM); 0.054 g of monomer M (MEDM) and 0.492 g of monomer D (DGDM), 1.0 g THF, and 0.154 g of a 182 mM/kg solution of potassium 3,3-Diethoxy-1-propanoate in THF was sealed in a vial and incubated at 55° C. for 14 hrs in an argon-filled glove box. The polymerization mixture was then diluted with 8 mL of water containing HCl. Polymer was precipitated from a solution by heating to 70° C., centrifuged and dried in vacuo. Product recovery was 1.028 g (100%). No residual monomer was found in the polymerization mix by GPC. Mn=36100, Mw/Mn=1.11. Polymer product was soluble in cold water and PBS, liquid at RT and formed a non-flowing gel at 35.5° C. (PBS) at concentration of 9.7% (w/w). Other co- and ter-polymers of O, M, D and T with or without hydrophobic co-monomers may be readily synthesized by the same or similar procedures.

Example 27

Gelation Temperatures of Water-Soluble Carbohydrate Polyethers

Figure 6:
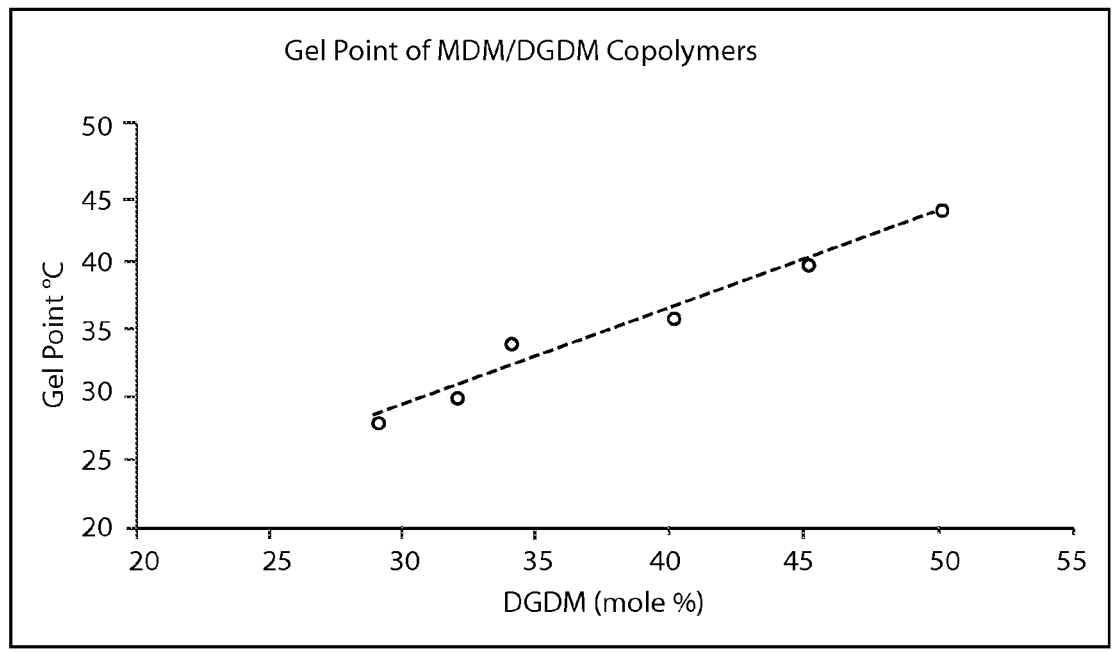
FIG. 6 presents a graph depicting the gelation temperature (Gel Point) vs. Mol % DGDM in MDM/DGDM copolymers.
Figure 7:
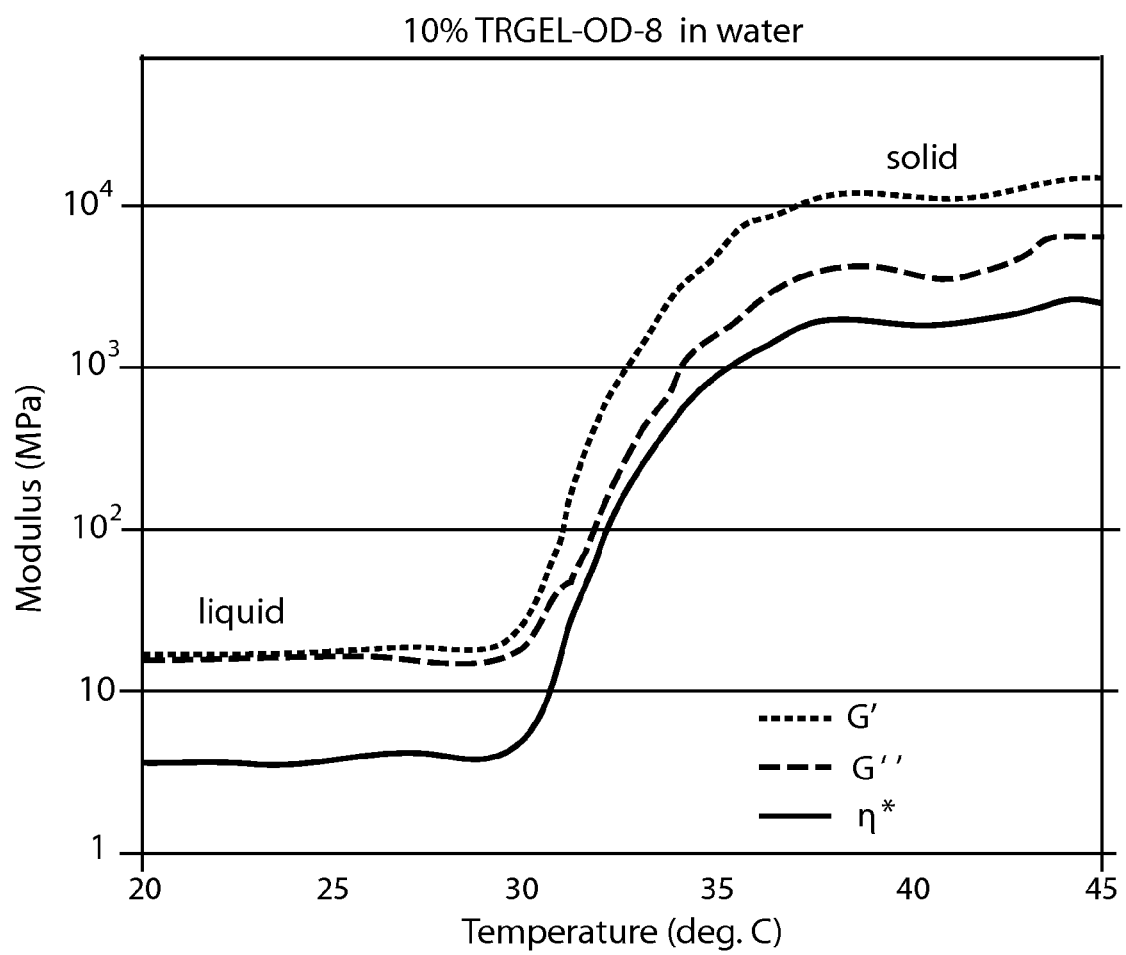
FIG. 7 presents a graph depicting viscoelastic transitions of 10% (TRIGEL-OD-8) in water.
Figure 8:
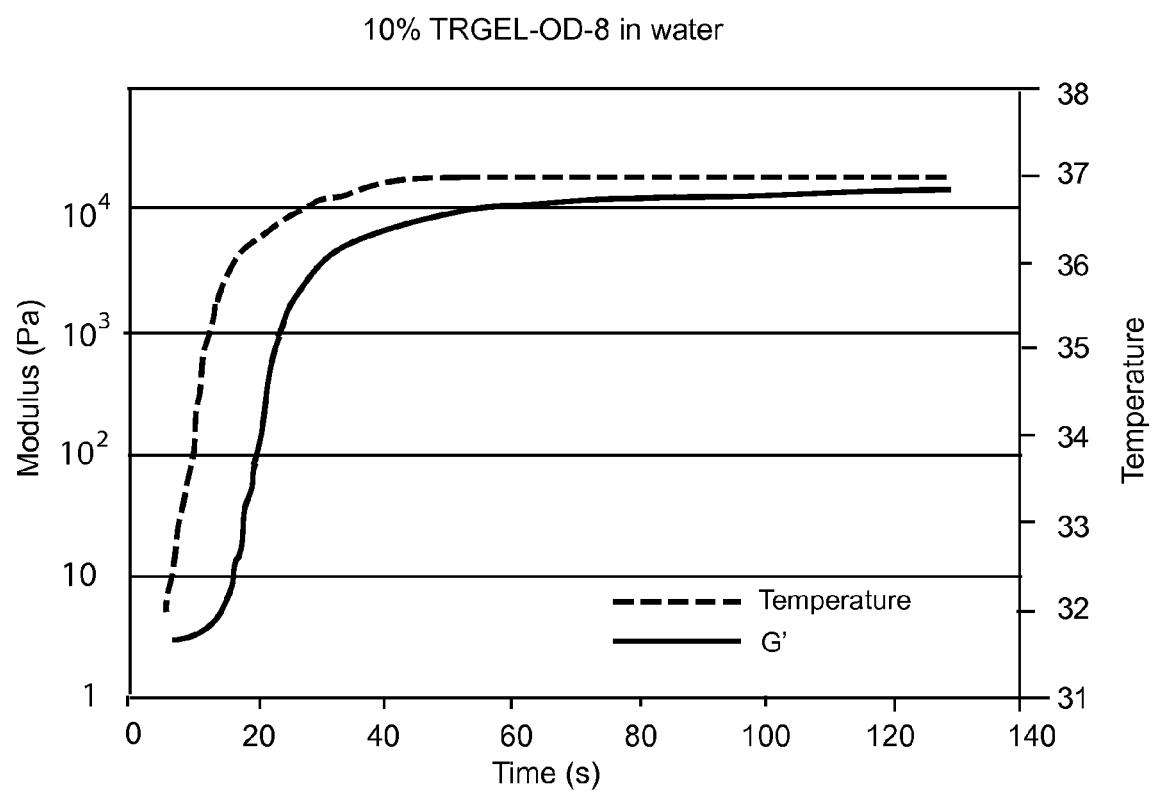
FIG. 8 presents a graph depicting the kinetics of 10% (TRIGEL-OD-8) in water.

To determine gelation temperature, water-soluble polymers of the present invention were dissolved in water at 10% w/v and solution temperature was increases at approximately 2° C./min as the viscosity of the solution was monitored with rheometer (TA Instruments, model number AR-62). The lowest temperature at which the solution ceased to flow was recorded as the gelation temperature. Gelation temperatures of representative water-soluble carbohydrate polyethers of the present invention as determined by the procedure described herein are presented in Table 5 and a graph showing the gelation temperature (Gel Point) vs. Mol % DGDM in MDM/DGDM copolymers is presented in FIG. 6. A graph showing the viscoelastic transitions of a 10% aqueous solution of the polymer designated as TRGEL-OD-8 in Table 5 is shown in FIG. 7, while a graphic presentation of the solution kinetics is shown in FIG. 8

TABLE 5

| | Gel Temp (° C.) | MDM (mole %) | MEDM (mole %) | DGDM (mole %) | 3GDM (mole %) |
|---|---|---|---|---|---|
| pMDMDM/MEDM-58 | 17 | 50 | 50 | | |
| pMDMDM/MEDM-59 | 23 | 25 | 75 | | |

TABLE 5-continued

| | Gel Temp (° C.) | MDM (mole %) | MEDM (mole %) | DGDM (mole %) | 3GDM (mole %) |
|---|---|---|---|---|---|
| pMDM/DGDM-53 | 28 | 71 | | 29 | |
| pMDM/DGDM-8 | 30 | 68 | | 32 | |
| pMDM/DGDM-62 | 34 | 66 | | 34 | |
| pMDM/DGDM-56 | 36 | 60 | | 40 | |
| pMDM/DGDM-63 | 40 | 55 | | 45 | |
| pMDM/DGDM-50 | 44 | 50 | | 50 | |
| pMDM/3GDM-67 | 38 | 78 | | | 22 |
| pMDM/3GDM-68 | 40 | 66 | | | 34 |
| pMDM/3GDM-69 | 44 | 49 | | | 51 |
| pMDM/ME/DGDM-65 | 27 | 50 | 38 | | |
| pMDM/ME/DGDM-66 | 29 | 59 | 20 | | |
| pMDM/ME/DGDM-64 | 34 | 49 | 25 | | |
| TRGEL-OM-58 | 17 | 50 | 50 | 0 | 0 |
| TRGEL-OM-59 | 23 | 25 | 75 | 0 | 0 |
| TRGEL-OD-53 | 28 | 71 | 0 | 29 | 0 |
| TRGEL-OD-8 | 30 | 68 | 0 | 32 | 0 |
| TRGEL-OD-62 | 34 | 66 | 0 | 34 | 0 |
| TRGEL-OD-56 | 36 | 60 | 0 | 40 | 0 |
| TRGEL-OD-63 | 40 | 55 | 0 | 45 | 0 |
| TRGEL-OD-50 | 44 | 50 | 0 | 50 | 0 |
| TRGEL-OT-67 | 38 | 78 | 0 | 0 | 22 |
| TRGEL-OT-68 | 49 | 66 | 0 | 0 | 34 |
| TRGEL-OT-69 | 57 | 49 | 0 | 0 | 51 |
| TRGEL-OMD-65 | 27 | 50 | 38 | 13 | 0 |
| TRGEL-OMD-66 | 29 | 59 | 20 | 21 | 0 |
| TRGEL-OMD-64 | 34 | 49 | 25 | 26 | 0 |

Example 28

For water-soluble homopolymers comprising monomer units of structural formula (IX), the lowest critical solution temperature point (LCST point) vs. p (number of $CH_2CH_2$—O units in side-chain) is presented in Table 6.

TABLE 6

| Polymer Designation | p = | LCST (° C.) |
|---|---|---|
| poly-MDM | 0 | n/a |
| poly-MDM | 1 | 30 |
| poly-DGDM | 2 | 54 |
| poly-3GDM | 3 | 74 |

The invention being thus described, it will be obvious that the same may be varied in many ways. Such variations are not to be regarded as a departure from the spirit and scope of the invention and all such modifications are intended to be included within the scope of the following claims.

I claim:

1. A polymer composition comprising:
a C2-C3 linked polyether of a 1,6:2,3-dianhydrohexopyranose derivative comprising one or more monomeric units selected from the group consisting of
a monomeric unit of the structural formula

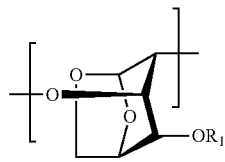

a monomeric unit of the structural formula

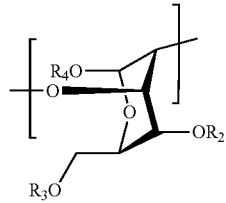

and a monomeric unit of the structural formula

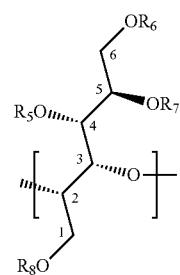

wherein $R_1$, $R_2$, $R_3$, $R_4$, $R_5$, $R_6$, $R_7$ and $R_8$ are moieties chosen to render the polymer composition soluble in aqueous media.

2. The polymer composition of claim 1 wherein at least one of moieties $R_1$, $R_2$, $R_3$, $R_4$, $R_5$, $R_6$, $R_7$ and $R_8$ has the structure

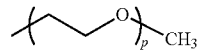

wherein p is an integer from 1 to 10.

3. The polymer composition of claim 1 that exhibits reverse thermal gelation properties.

4. The polymer composition of claim 3 with a critical solution temperature from 17° to 74° C.

5. The polymer composition of claim 3 with a critical solution temperature from 17° to 44° C.

6. The polymer composition of claim 1 with a molecule weight from 2 to 350 kDa.

7. The polymer composition of claim 1 with a molecule weight from 5 to 150 kDa.

8. The polymer composition of claim 2 wherein p is an integer from 1 to 4.

9. The polymer composition of claim 2 wherein p is an integer from 1 to 2.

10. The polymer composition of claim 1 wherein one or more of moieties $R_1$, $R_2$, $R_3$, $R_4$, $R_5$, $R_6$, $R_7$ and $R_8$=OH.

11. The polymer composition of claim 2 with a critical solution temperature from 17° to 74° C.

12. The polymer composition of claim 2 with a critical solution temperature from 17° to 44° C.

13. The polymer composition of claim 8 with a molecule weight from 2 to 350 kDa.

14. The polymer composition of claim 8 with a molecule weight from 5 to 150 kDa.

15. The polymer composition of claim 1 wherein 1 to 5% of the moieties $R_1$=allyl.

16. The polymer composition of claim 1 with a polydispersity index less than or equal to 1.5.

17. The polymer composition of claim 1 wherein the composition is a homopolymer.

18. The polymer composition of claim 1 wherein the composition is a copolymer.

19. The polymer composition of claim 1 wherein the composition is a terpolymer.

20. The polymer composition of claim 1 wherein at least one of $R_3$ and $R_4$=acetate.

* * * * *